(12) United States Patent
Zhi et al.

(10) Patent No.: US 10,593,958 B2
(45) Date of Patent: Mar. 17, 2020

(54) METHOD FOR PREPARING HIERARCHICALLY POROUS DOPED CARBON MATERIAL AND ITS USE

(71) Applicant: City University of Hong Kong, Kowloon (HK)

(72) Inventors: Chunyi Zhi, New Territories (HK); Zengxia Pei, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 427 days.

(21) Appl. No.: 15/398,942

(22) Filed: Jan. 5, 2017

(65) Prior Publication Data

US 2018/0190996 A1  Jul. 5, 2018

(51) Int. Cl.
| | | |
|---|---|---|
| *H01M 4/36* | (2006.01) |
| *H01M 4/96* | (2006.01) |
| *H01M 4/86* | (2006.01) |
| *H01M 4/88* | (2006.01) |
| *H01M 12/06* | (2006.01) |
| *H01M 8/18* | (2006.01) |

(52) U.S. Cl.
CPC .......... *H01M 4/96* (2013.01); *H01M 4/8605* (2013.01); *H01M 4/8875* (2013.01); *H01M 4/8878* (2013.01); *H01M 8/18* (2013.01); *H01M 12/06* (2013.01)

(58) Field of Classification Search
CPC .... H01M 4/96; H01M 4/8605; H01M 4/8875; H01M 4/8878; H01M 8/18; H01M 12/06
See application file for complete search history.

(56) References Cited

U.S. PATENT DOCUMENTS 9,455,439 B2 * 9/2016 Dai ..................... H01M 4/137

OTHER PUBLICATIONS

D. K. Singh, K. S. Krishna, S. Harish, S. Sampath, and M. Eswaramoorthy, No more HF: teflon-assisted ultrafast removal of silica to generate high-surface-area mesostructured carbon for enhanced CO2 capture and supercapacitor performance, Angew. Chem. Int. Ed. 2016, 55, 2032-2036.
W. He, C. Jiang, J. Wang, and L. Lu, High-rate oxygen electroreduction over graphitic-N species exposed on 3D hierarchically porous nitrogen-doped carbons. Angew. Chem. Int. Ed. 2014, 53, 9503-9507.

(Continued)

*Primary Examiner* — Jane J Rhee
(74) *Attorney, Agent, or Firm* — Renner Kenner Greive Bobak Taylor & Weber

(57) ABSTRACT

A method for preparing a hierarchically porous doped carbon material includes the steps of heating a mixture including an etching agent precursor and a pore-generating agent. The pore-generating agent is embedded in a matrix including a carbon source and a dopant source for simultaneously carbonizing the carbon source. The method further includes doping with the dopant and etching the pore-generating agent for obtaining the hierarchically porous doped carbon material. The hierarchically porous doped carbon material can form an electrode, and an energy storage device such as a supercapacitor can include such an electrode. The hierarchically porous doped carbon material can also help form an energy storage and conversion device such as a metal-air battery or a regenerative fuel cell.

24 Claims, 36 Drawing Sheets
(3 of 36 Drawing Sheet(s) Filed in Color)

(56) References Cited

OTHER PUBLICATIONS

H. Liang, X. Zhuang, S. Brüller, X. Feng, and K. Müllen, Hierarchically porous carbons with optimized nitrogen doping as highly active electrocatalysts for oxygen reduction. Nat. Commun. 2014, 5:4973.

J. Liang, Y. Zheng, J. Chen, J. Liu, D. Hulicova-Jurcakova, M. Jaroniec, and S. Z. Qiao, Facile oxygen reduction on a three-dimensionally ordered macroporous graphitic C3N4/carbon composite electrocatalyst. Angew. Chem. Int. Ed. 2012, 51, 3892-3896.

\* cited by examiner

METHOD FOR PREPARING HIERARCHICALLY POROUS DOPED CARBON MATERIAL AND ITS USE

TECHNICAL FIELD

The present invention relates to a method for preparing a hierarchically porous doped carbon material, especially preferably but not exclusively a hierarchically porous N, S dually-doped carbon material. Said method comprises a simultaneous carbonizing of a carbon source, doping with a dopant and etching of a pore-generating agent in one reaction step for obtaining the hierarchically porous doped carbon material. The present invention further provides the hierarchically porous doped carbon material obtainable by, in particular obtained by said method. In still another aspect, the present invention provides an electrode comprising said hierarchically porous doped carbon material and an energy storage device such as a supercapacitor comprising said electrode. Additionally, the present invention provides an energy storage and conversion device comprising said hierarchically porous doped carbon material such as a metal-air battery or a regenerative fuel cell.

BACKGROUND OF THE INVENTION

Electrochemical oxygen reduction/evolution reactions (ORR/OER) play a crucial role in many decisive energy conversion and industrial production reactions in both acidic and alkaline electrolytes such as acidic/alkaline fuel cells, metal-air batteries, water-splitting and chlor-alkali electrolysers. The coupled multi-electron and multi-proton $O_2$ reduction/evolution processes involve several intermediates and reaction barriers, which makes the ORR/OER inherently kinetically sluggish and thus poses great challenges to the development of highly active bi-functional oxygen catalysts.

To date, Pt- and Ir-based compounds are recognized as the most efficient ORR and OER catalysts, respectively, but their broad application is significantly limited by the concomitant affordability and scarcity of the noble metals. Additionally, noble metal-based catalysts suffer from poor durability caused by different mechanisms including dissolution, sintering, ripening and leaching as well as susceptibility to crossover effect induced deactivation in case of Pt/C. Therefore, cost-effective highly efficient and stable ORR/OER materials as alternatives to noble metal catalysts are urgently required.

Among various catalysts developed so far, heteroatom-doped carbon materials exhibit a great potential as candidates for exerting ORR/OER owing to their unique electronic and structural features and robustness as matrix in different electrolytes. Although great advances have been achieved, most of the non-metal element doped carbon materials as metal-free catalysts still show inferior intrinsic ORR/OER activities compared to noble metal-based ones. In principle, a favored ORR/OER catalyst should be capable to deliver a sufficiently high reaction current at low overpotential to warrant efficient power output and energy conversion efficiency. Within this context, it seems that efficient ORR/OER carbon materials should feature good conductivity for charge transfer, abundant accessible active sites for implementing reaction, and a suitable porous structure for mass transport. Porosity is thereby proposed as a pivotal factor that affects all three aspects, and appropriate porous structure engineering can render a large specific surface area and facilitate harness of active sites, which can affect ORR/OER electroactivities.

To achieve sufficient porosity, various templates or pore-generators, such as silica (Liang, H.-W. et al., Nature Commun. 5, 4973, 2014, Liang, J. et al., Angew. Chem. Int. Ed. 51, 11496-11500, 2012), porous alumina (Liang, C. et al., Angew. Chem. Int. Ed. 47, 3696-3717, 2008), polystyrene (Liang, J. et al., Adv. Mater. 26, 6074-6079, 2014) and cellulose (He, W. et al., Angew. Chem. Int. Ed. 53, 9503-9507, 2014) have been adopted with the resulting porous carbon materials exhibiting increased performances. Nevertheless, additional activation steps such as by $NH_3$ or KOH treatment are often required to fulfill the desired hierarchical nanoarchitectures (He, W. et al., Angew. Chem. Int. Ed. 53, 9503-9507, 2014, Liang, H.-W. et al., Nature Commun. 5, 4973, 2014). Moreover, the deliberately introduced rigid templates have to be removed by cumbersome post treatments. For example, silica needs toxic HF solution or concentrated alkaline reagents at elevated temperatures, whilst polystyrene and cellulose templates have to be removed by lengthy immersion in organic solvents (Liang, J. et al., Angew. Chem. Int. Ed. 51, 11496-11500, 2012, Liang, J. et al., Adv. Mater. 26, 6074-6079, 2014). Those additional steps limit the potential scale-up of these processes and can be associated with the leaching of relevant active species. Respective prior art methods with such additional steps are referenced herein as "two-step" processes.

Therefore, there remains a strong need for a fast and economically-efficient synthesis approach for preparing hierarchically porous doped carbon materials with appropriate properties and sufficient catalytic performance such as for ORR/OER reactions. In particular such method should be suitable for industrial scale production.

SUMMARY OF THE INVENTION

The first aspect of the present invention relates to a method for preparing a hierarchically porous doped carbon material, in particular a hierarchically porous N, S dually-doped carbon material. Said method comprises a step of heating a mixture comprising an etching agent precursor and a pore-generating agent which is embedded in a matrix which matrix comprises a carbon source and a dopant source for simultaneously carbonizing the carbon source, doping with the dopant and etching the pore-generating agent for obtaining the hierarchically porous doped carbon material. Said method of the present invention may further comprise a step of embedding the pore-generating agent in the matrix.

The present invention provides in a second aspect the hierarchically porous doped carbon material obtainable by, in particular obtained by the method described above.

In still another aspect, the present invention provides an electrode comprising the hierarchically porous doped carbon material obtainable by, in particular obtained by the method described above. Still further provided is an energy storage device such as a supercapacitor comprising said electrode.

Further, the present invention refers to an energy storage and conversion device comprising the hierarchically porous doped carbon material obtainable by, in particular obtained by the method described above. The energy storage and conversion device can be a metal-air battery such as a Zn-air battery or lithium-air battery or a regenerative fuel cell. The hierarchically porous doped carbon material of the present invention is particularly suitable to be used as electrocatalyst in oxygen reduction/evolution reactions (ORR/OER) and hydrogen evolution reactions (HER) in such devices.

Still further, the present invention provides the use of the energy storage or energy storage and conversion device in a system selected from automobile, power quality, engine starting, energy storage in photovoltaic, energy storage in windmills, medical system, mobile propulsion system, military electronics, transportation system, commercial electronics, consumer electronics, portable electronics, audio system and consumer appliance.

The method of the present invention allows for producing a doped, micro-, meso- and macroporous carbon material which can be directly used as catalyst without further purification and washing steps via a simultaneous carbonizing of the carbon source, doping with the dopant and etching of the pore-generating agent in one step, also referred to as "one-step" pyrolysis reaction. In particular the method allows for preparing N and S dually-doped, micro-, meso- and macroporous carbon catalysts via said one-step pyrolysis reaction which exhibit exceptional properties.

Known methods for preparing doped carbon materials involve first pyrolysis of respective template embedded precursors such as a carbon source and then in a separate step removing the template via post treatment. In the present invention, etching of the template that is the pore-generating agent, carbonization of the carbon source and the doping were integrated together in a one-step pyrolysis reaction. More specifically, this invention integrates the template removal that is the removal of the pore-generating agent, the doping in particular as heteroatom doping and the carbonization of the carbon source into a single one-step pyrolysis reaction. For example, simultaneous in-situ etching toward silica as pore-generating agent by Teflon powder as etching agent precursor, the carbonization of sucrose as carbon source and the decomposition of trithiocyanuric acid (TA) as dopant source for doping are integrated together in form of a one-step pyrolysis reaction.

By this means, the resultant carbon material is characterized by a hierarchically micro-, meso- and macroporous structure with an advantageously high specific surface area and abundant dopant species. More significantly, the pore-generating agent can be varied to tune the diameter of the porous structure, and carbon source and/or dopant source can be easily varied such as to get other element (including metal atoms) doped carbon materials. Using this invention, the synthetic procedures for preparing doped carbon materials can be simplified and the use of toxic or corrosive chemical reagents for template removal can be avoided. Post treatment and further activation steps after pyrolysis such as with KOH or $NH_3$ as applied in known processes are not required which significantly reduces the reaction and fabrication time and avoids a dopant leaching due to required additional purification steps. The method of the present invention further uses starting materials which are commercially available at economically-efficient prices. The present invention, thus, provides a highly cost-effective and time-saving way for producing hierarchically porous doped carbon material with exceptional properties suitable for industrial scale production. The method of the present invention can be applied to prepare a variety of structured and doped carbon materials for diverse applications.

In particular the hierarchically porous N and S dually-doped carbon material obtained or obtainable with said method can be applied in various energy storage and conversion reactions and respective devices, more specifically the hierarchically porous doped carbon material can be used (1) as highly active electrocatalyst in oxygen reduction/evolution reactions (ORR/OER) and hydrogen evolution reaction (HER);

(2) as electrode material in supercapacitors and metal-air batteries.

The inventors unexpectedly found that the hierarchically porous doped carbon material obtainable by the method of the present invention exhibits outstanding oxygen reduction/oxygen evolution activities with a metric potential difference of 0.72 V in 1 M KOH, the best value for metal-free catalysts reported so far with high stability in different electrolytes. The excellent performances of the hierarchically porous doped carbon material as catalyst were confirmed by the inventors and include good conductivity, abundant accessible dopant species and exceptionally suitable porous architectures. More specifically, the inventors could show that a hierarchically porous N and S dually-doped carbon material prepared by the method of the present invention exhibits comparable or even better ORR activities with regard to the state-of-the-art Pt/C catalyst in both alkaline and acidic electrolytes and outperform most of the efficient metal-free ORR catalysts known so far. Furthermore, the hierarchically porous N and S dually-doped carbon material prepared by the method of the present invention can behave as an OER catalyzer, and its overall bi-functional ORR/OER performance ranks as the best value by metal-free reversible oxygen catalysts reported to date. Moreover, the inventors could show that the performance of a rechargeable Zn-air battery based on said hierarchically porous N and S dually-doped carbon material as catalyst substantially outperforms those afforded by benchmark Pt/C catalysts.

For example, the optimized 1100-CNS catalyst provided by the present method proved to allow for an onset potential of 0.99 V (0.88 V), a $E_{1/2}$ of 0.85/0.88 V (0.73 V) in 0.1 M KOH ($HClO_4$) solution together with good durability for ORR, making it to one of the best-performing metal-free catalysts ever reported and a highly promising alternative to the state-of-the-art Pt/C catalyst. The excellent electrocatalytic performance is ascribed to the integrated good conductivity, abundant dopant species and hierarchically porous architecture meriting by the one-step pyrolysis reaction. In addition, the metric $\Delta E$ ($E_{j=10}-E_{1/2}$) value of was only 0.72 V in 1 M KOH, the best value for metal-free catalysts so far. Moreover, the rechargeable Zn-air battery using 1100-CNS as air-cathode catalyst presented a small charge-discharge voltage gap (0.77 V@ 10 mA $cm^{-2}$), high reversibility (initial round-trip efficiency of 61%) and excellent stability (voltage gap increase of 85 mV after 300 cycles), which outperforms those of the Pt/C catalyst based counterpart.

Those skilled in the art will appreciate that the invention described herein is susceptible to variations and modifications other than those specifically described. The invention includes all such variations and modifications. The invention also includes all steps and features referred to or indicated in the specification, individually or collectively, and any and all combinations of the steps or features.

Other features and aspects of the invention will become apparent by consideration of the following detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A shows the XPS survey spectra reviewing the component elements of a series of prepared hierarchically porous N, S dually-doped carbon materials referenced as "CNS", wherein the heating temperature for simultaneously carbonizing the carbon source, doping with the dopant and etching the pore-generating agent (also referenced as "pyrolysis temperature", i.e. temperature during the pyrolysis reaction) is indicated in the respective name, i.e. is 800° C., 900° C., 1000° or 1100° C. FIG. 1Q shows high resolution S 2p XPS spectra of the prepared hierarchically porous N, S dually-doped carbon materials.

FIG. 2A shows the CV curves of 1100-CNS and the Pt/C catalyst in $N_2$ and $O_2$ saturated 0.1 M KOH. FIG. 2B shows LSV curves of different samples recorded at 1600 rpm and 5 mV $s^{-1}$. FIG. 2C shows LSV curves of 1100-CNS recorded from different rotation speeds, inset is K-L plots at different potentials including the electron transfer number (n) per $O_2$ from the K-L model. FIG. 2D shows polarization curves of 1100-CNS with different loading masses as compared with the Pt/C catalyst (20 wt.-%). FIG. 2E shows RRDE voltammograms of 1100-CNS and the Pt/C catalyst at 1600 rpm. The ring currents were amplified by 5 for better resolution. FIG. 2F shows electron transfer number (n) and $HO_2^-$ yield derived from the RRDE tests.

FIG. 3A shows LSV curves of the metal-free hierarchically porous doped carbon materials prepared according to the present invention and the Pt/C catalyst recorded from $O_2$ saturated 0.1 M $HClO_4$ solution at 1600 rpm. FIG. 3B shows the electron transfer number (n) and $H_2O_2$ yield in 0.1 M $HClO_4$ from the RRDE tests. FIG. 3C shows polarization curves of 1100-CNS and Pt/C in $O_2$ saturated 0.5 M $H_2SO_4$ solution at 1600 rpm. FIG. 3D shows LSV curves of 1100-CNS and noble-metal catalysts for OER at 1600 rpm in KOH solutions. The concentration of the KOH solution is indicated. FIG. 3E shows corresponding Tafel plots from the LSV curves. FIG. 3F shows LSV curves showing the bi-functional ORR/OER activities in 0.1 M KOH.

FIG. 4A shows the polarization and the corresponding power density curves of the Zn-air battery with 1100-CNS and the Pt/C catalyst versus different Zn electrodes, the postfix numbers indicate the area of the Zn plate. FIG. 4B shows the galvanostatic discharge curves of the primary Zn-air battery at different current densities, which were normalized to the area of the air cathode FIG. 4C shows the long-term durability tests of the Zn-air battery using the 1100-CNS as catalyst at a constant current density of 5 mA $cm^{-2}$, the Zn plate and the electrolyte (6 M KOH) were replenished periodically as indicated by the arrows. FIG. 4D shows the charging and discharging polarization curves of 1100-CNS and the Pt/C catalyst. FIG. 4E shows the rechargeability cycling tests of the Zn-air battery using 1100-CNS or Pt/C as catalyst at 10 mA $cm^{-2}$. FIG. 4F is a photograph showing the lighting of a LED by two Zn-air batteries using 1100-CNS as catalyst in series.

DETAILED DESCRIPTION OF THE INVENTION

Figure 1A:
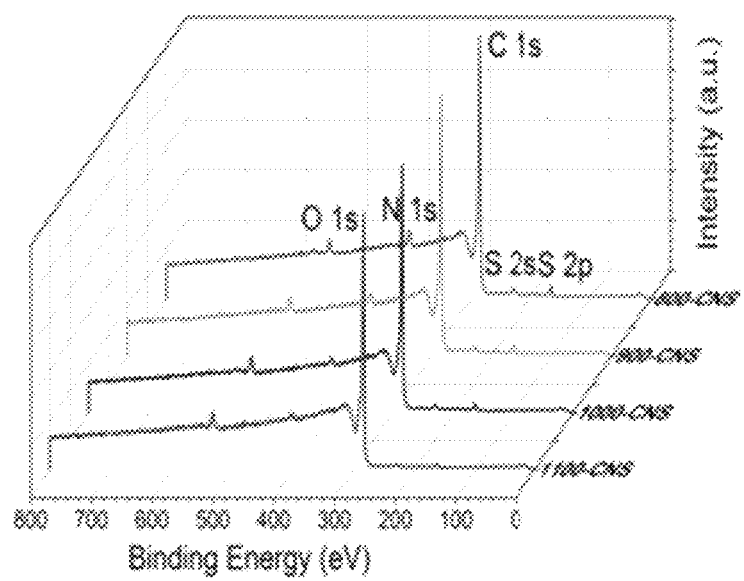
FIGS. 1A through 1Q refer to the structural and compositional characterization of hierarchically porous doped carbon material prepared according to the present invention.

Unless otherwise defined, all technical terms used herein have the same meaning as commonly understood by one skilled in the art to which the invention belongs.

As used herein, "comprising" means including the following elements but not excluding others. "Essentially consisting of" means that the material consists of the respective element along with usually and unavoidable impurities such as side products and components usually resulting from the respective preparation or method for obtaining the material such as traces of further components or solvents. The expression that a material "is" certain element such as the carbon source is sucrose as used herein means that the material essentially consists if said element. As used herein, the forms "a," "an," and "the," are intended to include the singular and plural forms unless the context clearly indicates otherwise.

The present invention provides in a first aspect a method for preparing a hierarchically porous doped carbon material. Said method comprises a step of heating a mixture comprising an etching agent precursor and a pore-generating agent which is embedded in a matrix which matrix comprises a carbon source and a dopant source for simultaneously carbonizing the carbon source, doping with the dopant and etching the pore-generating agent for obtaining the hierarchically porous doped carbon material. Said heating step is also referenced as "pyrolysis/calcination" step hereinafter.

The term "carbon material" as used herein is understood to mean a material comprising at least about 90 wt.-% carbon, preferably greater than about 90 wt.-% carbon, and most preferably more than about 95 wt.-% carbon based on the weight of the carbon material which can be present, for example, in form of graphene layers. The carbon material may further comprise oxygen such as with an amount of up to 5 wt.-% based on the weight of the carbon material. In preferred embodiments of the present invention, the carbon material has an amount of more than about 95 wt.-% of carbon and up to 5 wt.-% of oxygen. The amount of carbon and for example oxygen in the carbon material may be determined using traditional combustion elemental analysis and X-ray Photoelectron Spectroscopy (XPS). The carbon material is preferably a powder.

Said carbon material is further doped. The term "doped" as used herein refers to the addition of non-carbon elements to the carbon material resulting from the dopant source. The term "doped" in this context, thus, means an addition of one or more dopants from the dopant source in particular selected from heteroatoms and/or metals to said carbon material, further preferred heteroatoms such as N and/or S, most preferably N and S. I.e. the carbon material is most preferably N, S dually-doped. The term doped in particular means a content of heteroatoms selected from N, S or both of them resulting from the dopant source with an amount of between about 1 wt.-% and about 15 wt.-%, in particular of between about 2 wt.-% and 10 wt.-% and more preferably of between about 3 wt.-% and about 8 wt.-% in the doped carbon material. The amount of the dopant in the carbon material may be determined using traditional combustion elemental analysis and XPS.

The term "porous" generally denotes a material having pores, i.e. having void (i.e. "empty") spaces. As used herein, the term "hierarchically porous" refers to the presence of at least three different pore sizes in the porous carbon material, more specifically at least one set of pores being microporous, at least one set of pores being mesoporous and at least one set of pores being macroporous. Macropores are generally known as and in accordance with the IUPAC nomenclature pores with a diameter of greater than 50 nm, mesoporous as pores having a diameter of greater than 2 nm and up to 50 nm and micropores as pores with a diameter of up to 2 nm. The pore size distribution can be measured by methods known to one of skill in the art such as the Barrett-Joyner-Halenda method. The porous carbon material in particular includes at least a set of macropores with a pore diameter of about 80 nm to about 100 nm, a set of mesopores with a pore diameter between about 5 nm and 15 nm and micropores. In still more preferred embodiments of the present invention, the porous carbon material includes macropores in particular including pores with a pore diameter of about 90 nm, mesopores in particular including pores with a pore diameter of about 11 nm and micropores.

Said micropores, mesopores and macropores can be arranged in any way with respect to each other. For example, in embodiments of the present invention, the micropores, mesopores and macropores may be arranged in an apparently disordered manner, i.e. without any apparent organization among the same kind of pores. In other embodiments of the present invention, at least one or more of the micropores, mesopores and macropores are arranged in an ordered, namely a patterned manner, for example, in a cubic or hexagonal arrangement. The hierarchically porous doped carbon material is preferably a powder.

An "etching agent precursor" is a compound from which an etching agent can be formed in particular under the conditions of the heating step which etching agent is suitable to etch the pore-generating agent for forming pores under the conditions of the present method. The etching agent can be any etching agent suitable to etch the pore-generating agent, wherein the etching agent preferably comprises and more preferably is hydrogen fluoride (HF) in particular in embodiments in which the pore-generating agent comprises or is $SiO_2$. The etching agent precursor can comprise, for example, polytetrafluoroethylene, i.e. Teflon, in particular the etching agent precursor is polytetrafluoroethylene. The etching agent precursor, in particular polytetrafluoroethylene, is preferably used in the method of the present invention in form of a powder and more preferably with an average particle diameter of up to about 10 µm, more preferred of up to about 5 µm and in particular of less than 5 µm.

Unless otherwise specified, "diameter" as used for particles in the present invention preferably refers to the Feret (or Feret's) diameter at the thickest point of such particle. The Feret diameter is a measure of an object size along a specified direction and can be defined as the distance between the two parallel planes restricting the object perpendicular to that direction. The Feret diameter can be determined, for example, with microscopic methods. I.e. if the Feret diameters measured for the different directions of the particle or pore differ, the "diameter" referred to in the present invention always refers to the highest value measured. "Average diameter" refers to the average of "diameter" preferably measured with at least 10 particles.

A "pore-generating agent" is a compound which can be etched under the conditions of the present method for forming pores in the carbon material, in particular for forming macropores and preferably pores with a diameter between about 80 nm and about 100 nm, further preferred with a diameter of about 90 nm. The pore-generating agent preferably has an average particle diameter of about 0.15 µm to about 0.35 µm, in particular of between about 0.2 µm and 0.3 µm. The pore-generating agent in preferred embodiments of the present invention comprises and further preferred is $SiO_2$, i.e. silica. The weight ratio of the embedded pore-generating agent, which is in particular $SiO_2$, to the etching agent precursor, in particular polytetrafluoroethylene, is preferably about 1:5 to 1:20 and further preferred about 1:10 to about 1:15 and most preferred about 1:12.

A "carbon source" is a compound which can be carbonized under the conditions of the present method and can, further preferred, form polymers for providing the matrix. The carbon source is preferably a hydrogen-containing carbon source in particular in embodiments in which the etching agent is HF. In such preferred embodiments, the carbon source is both a source of carbon and a source of hydrogen for forming the etching agent HF. The carbon source can comprise and more preferably is a carbohydrate.

Carbohydrates also known as saccharides are compounds consisting of carbon, hydrogen and oxygen atoms and can be subdivided into monosaccharides, disaccharides, oligosaccharides and polysaccharides. Disaccharides contain two joined monosaccharides. The term oligosaccharide is usually used for three to nine joined monosaccharides and the term polysaccharide for more than nine joined monosaccharides. The carbon source preferably comprises a monosaccharide or a disaccharide or a mixture thereof. Preferred monosaccharides include glucose and fructose. Preferred disaccharides include sucrose, maltose and lactose. I.e. the carbon source can be, for example, selected from sucrose, maltose, lactose, glucose, fructose or mixtures thereof. The carbon source more preferably comprises and further preferred is a disaccharide in particular a disaccharide of the monosaccharides glucose and fructose. The carbon source most preferably comprises and in particular is sucrose.

A "dopant source" is a compound which provides the dopants such as one or more heteroatoms and/or metals, in particular one or more heteroatoms selected from N and/or S. For example, it is a compound which is N and S enriched, is preferably able to cross-link when forming the matrix and can decompose under the conditions of the present invention during the heating step. Such materials may include thiourea, trithiocyanuric acid (TA) or the like. The dopant source preferably comprises and more preferably is thiourea or TA, in particular TA. The TA is a N and S enriched compound that has broad applications in industry as a good sulfurizing reagent and cross-linking agent, and is, thus, especially suitable as dopant source and as cross-linker for the matrix formation here.

A "matrix" means any two- or three-dimensional network comprising the carbon source and the dopant source into which the pore-generating agent is embedded, i.e. in which the pore-generating agent is distributed, i.e. dispersed. The matrix is in particular formed by one or both of polymerizing the carbon source and cross-linking by the dopant source, in particular both of them in particular catalyzed by a catalyst.

The heating step in the present method is carried out for simultaneously carbonizing the carbon source, doping with the dopant and etching the pore-generating agent for obtaining the hierarchically porous doped carbon material. In particular, etching the pore-generating agent includes decomposing the etching agent precursor for forming the etching agent for etching during the heating step. In particular, doping with the dopant includes decomposing the dopant source during the heating step for providing the dopants for the doping.

The heating is carried out under an inert atmosphere, in particular under Ar atmosphere.

The heating rate is preferably between about 2° C./min and about 10° C./min, in particular it is about 5° C./min.

The heating step preferably includes a pre-heating followed by a main heating. The pre-heating in particular means an initial heating up to about 500° C. to about 700° C. and holding that temperature for at least about 30 min to about 90 min. The main heating preferably means a further heating to a temperature of up to about 700° C. to about 1200° C. and holding that temperature for about 2 h to about 4 h. In preferred embodiments of the method, the heating includes a pre-heating to about 550° C. to about 650° C. and holding that temperature for about 30 min to about 90 min and a subsequent main heating up to a temperature of about 750° C. to about 1150° C. and holding said temperature for about 2.5 to about 3.5 h. In most preferred embodiments of the method, the heating includes a pre-heating to about 600° C. and holding that temperature for about 60 min and a subsequent main heating up to a temperature of about 1100° C. and holding that temperature for about 3 h.

The method of the present invention preferably further comprises a step of embedding the pore-generating agent in the matrix. Said step comprises providing a pre-mixture comprising a pore-generating agent, a carbon source and a dopant source and subjecting said pre-mixture to conditions under which the matrix is formed. The pre-mixture may further comprise one or more of a solvent and/or a catalyst, in particular the pre-mixture further comprises a solvent and a catalyst. The solvent is preferably water, in particular deionized water. The catalyst can be any catalyst able to catalyze the matrix formation, in particular it is a catalyst able to catalyze the polymerization of the carbon source, i.e. the catalyst is in particular a polymerization catalyst. The catalyst is preferably $H_2SO_4$. The pre-mixture preferably essentially consists of the pore-generating agent, the carbon source, the dopant source, the solvent and the catalyst. The pre-mixture is preferably prepared by mixing the pore-generating agent with the solvent, in particular by dispersing $SiO_2$ in water, and then adding the carbon source, the dopant source and the catalyst.

The formed matrix with embedded pore-generating agent may be subjected to pulverization such as by grinding and/or to optionally further analysis steps such as Thermal Gravimetric Analysis (TGA) for determining the amount of the pore-generating agent, in particular $SiO_2$ before subjecting the material to the heating step for simultaneously carbonizing the carbon source, doping with the dopant and etching the pore-generating agent for obtaining the hierarchically porous doped carbon material.

For embedding the pore-generating agent in the matrix, the pore-generating agent used preferably has an average particle diameter of about 0.2 μm to about 0.3 μm and is most preferably $SiO_2$, i.e. silica, in form of a powder, preferably fumed silica.

The conditions under which the matrix is formed preferably include
(i) optionally subjecting the pre-mixture to sonication and removing the solvent portion of the pre-mixture;
(ii) heating the pre-mixture optionally after carrying out step (i) for one or more of, in particular for both of polymerization of the carbon source and/or cross-linking by the dopant source.

In preferred embodiments of the method, the pre-mixture is heated in step (ii) up to a temperature of between about 120° C. and about 200° C. and that temperature is held for at least about 5 h, more preferably to a temperature of about 160° C. and that temperature is held for about 10 h.

In preferred embodiments, in which the pre-mixture further comprises the solvent and the catalyst, the conditions under which the matrix is formed further include the step (i). "Sonication" generally refers to the irradiation of a liquid sample, presently the mixture of step (i), with sound energy resulting in agitation. Sonication is preferably carried out for at least about 5 min, in particular for about 10 min and the solvent portion is removed by heating the mixture up to about 100° C. The term "solvent portion" means the portion of the pre-mixture which is liquid at room temperature, i.e. at about 25±2° C. which in particular includes water.

The present invention provides in a second aspect the hierarchically porous doped carbon material obtainable by, in particular obtained by the method described above.

The hierarchically porous doped carbon material obtainable by, in particular obtained by the method described above in particular has a specific surface area of at least about 600 m$^2$ g$^{-1}$, more preferred of at least about 700 m$^2$ g$^{-1}$, preferably of at least about 830 m$^2$ g$^{-1}$, further preferred of about 840 m$^2$ g$^-$. The specific surface area can be measured by methods known to one of skill in the art, in particular by the Brunauer-Emmett-Teller (BET) method.

The total pore volume of the hierarchically porous doped carbon material obtainable by, in particular obtained by the method described above is preferably at least about 1.7 cm$^3$ g$^{-1}$ and at most about 2.0 cm$^3$ g$^{-1}$, further preferred at least about 1.8 cm$^3$ g$^{-1}$ and at most about 2.0 cm$^3$ g$^{-1}$, in particular it is about 1.88 cm$^3$ g$^{-1}$ preferably determined by nitrogen adsorption techniques. The total pore volume is formed by macropores, mesopores and micropores. One of skill in the art is aware of methods for determining the total pore volume such as by gas adsorption porosimetry with $N_2$. The micropore volume is preferably at least about 0.1 cm$^3$ g$^{-1}$ and in particular between about 0.16 cm$^3$ g$^{-1}$ and about 0.2 cm$^3$ g$^{-1}$. The micropore surface area is preferably at least about 200 m$^2$ g$^{-1}$ and further preferred at least about 340 m$^2$ g$^{-1}$ and most preferred about 364 m$^2$ g$^{-1}$.

The hierarchically porous doped carbon material obtainable by, in particular obtained by the method described above preferably exhibits a pore size distribution in particular determined by the Barrett-Joyner-Halenda method with at least one peak between about 80 nm and about 100 nm and at least one peak between about 5 nm and about 15 nm, further preferred at least one peak at about 90 nm and one peak at about 11 nm. I.e. the hierarchically porous doped carbon material includes pores with a diameter of between about 80 nm and about 100 nm and between about 5 nm and about 15 nm, further preferred of about 90 nm and of about 11 nm.

The hierarchically porous doped carbon material obtainable by, in particular obtained by the method described above is especially suitable as electrocatalyst in energy storage and conversion devices or electrode material in energy storage devices such as supercapacitors. In particular, said hierarchically porous doped carbon material is especially suitable as oxygen reduction catalyst and/or oxygen evolution catalyst, in particular as bifunctional catalyst.

The hierarchically porous doped carbon material obtainable by, in particular obtained by the method described above exhibits outstanding oxygen reduction/oxygen evolution activities for example with an ORR half-wave potential ($E_{1/2}$) versus reversible hydrogen electrode (RHE) of preferably at least about 0.8 and in particular of about 0.85 at a loading of about 0.14 mg cm$^{-2}$ or about 0.88 at a loading rate of about 0.42 mg cm$^{-2}$ in 0.1 M KOH electrolyte. The ORR $E_{1/2}$ versus RHE of the hierarchically porous doped carbon material obtainable by, in particular obtained by the method described above in 0.1 M $HClO_4$ is preferably about at least about 0.7 and in particular about 0.73 and in 0.5 M $H_2SO_4$ preferably at least about 0.7 and in particular about 0.72 at a loading rate of about 0.6 mg cm$^{-2}$. The $\Delta E$ value as difference between the OER potential being taken at 10 mA cm$^{-2}$ (E) and the $E_{1/2}$ in ORR (namely, $\Delta E=E_{j=10}-E_{1/2}$) of the hierarchically porous doped carbon material is at most about 0.9 V and in particular about 0.81 V in 0.1 M KOH and 0.72 V in 1 M KOH The possible impurity elements Si and F in particular as determined by X-ray photoelectron spectroscopy (XPS) are preferably about 0.04 at % or less for Si and about 0.06 at % or less for F.

In particular embodiments of the present invention, the carbon material is doped with both N and S also referenced as "N, S dually-doped". N and S are in particular uniformly distributed in the hierarchically porous doped carbon material. The total amount of the sum of N and S in the carbon material is preferably between about 1 wt.-% and about 15 wt. %, further preferred between about 2 wt.-% and about 10 wt.-% and in particular between about 3 wt.-% and about 7 wt.-% and further preferred about 3 wt.-% to about 4 wt.-% based on the weight of the hierarchically porous doped carbon material.

Figure 6:
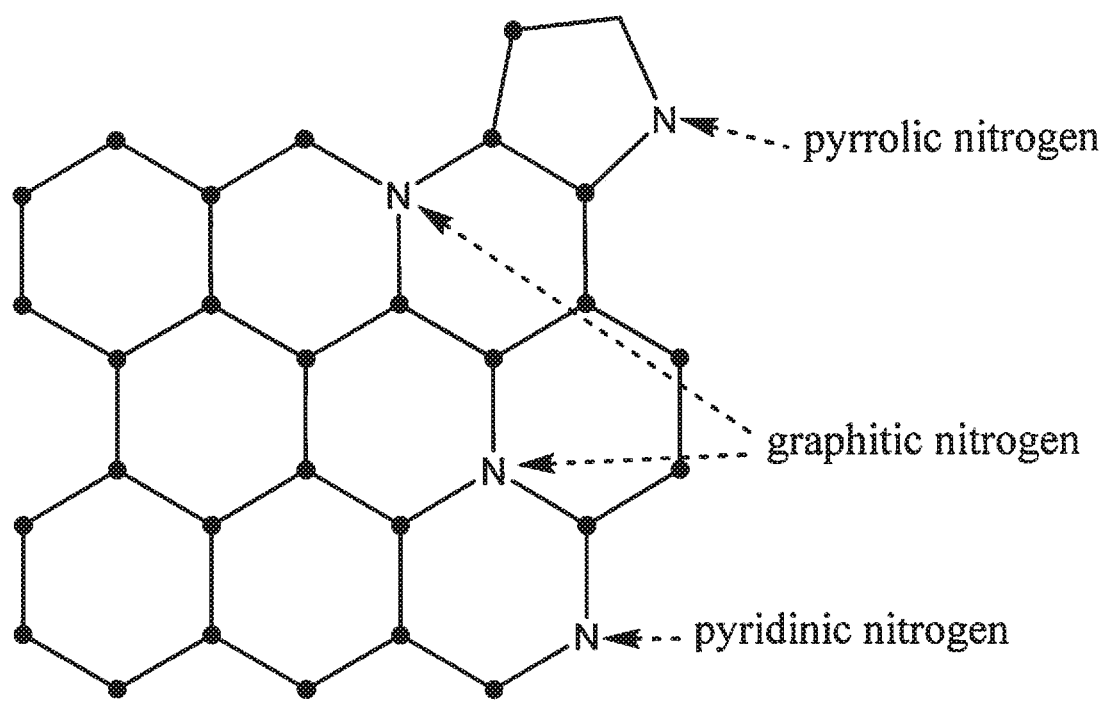
FIG. 6 is a schematic illustration of the nitrogen positions in the graphene layers.

N can be doped in the carbon material in form of pyridinic, graphitic or pyrrolic nitrogen which is known to one of skill in the art and further illustrated in FIG. 6. The relative content of nitrogen in form of graphitic nitrogen in the hierarchically porous doped carbon material of the present invention is preferably at least about 70%, further preferred at least about 80% and in particular more than about 80% of the total amount of nitrogen, i.e. pyrrolic, pyridinic and graphitic nitrogen, as determined, for example, by XPS measurements.

The term "oxygen reduction catalyst" as used herein means a catalyst that predominantly catalyzes oxygen reduction reaction activity over other reactions such as oxygen evolution. The term "oxygen evolution catalyst" as used herein means a catalyst that predominantly catalyzes oxygen evolution reaction activity over other reactions such as oxygen reduction. The term "bifunctional catalyst" as used herein means a catalyst that catalyzes both the oxygen reduction reaction and the oxygen evolution reaction.

In another aspect, the present invention provides an electrode comprising the hierarchically porous doped carbon material obtainable by, in particular obtained by the method described above. Still further provided is an energy storage device such as a supercapacitor comprising said electrode.

Further, the present invention refers to an energy storage and conversion device comprising the hierarchically porous doped carbon material obtainable by, in particular obtained by the method described above. The energy storage and conversion device can be a metal-air battery such as a Zn-air battery or Li-air battery or a regenerative fuel cell. The hierarchically porous doped carbon material of the present invention can be used as electrocatalyst in oxygen reduction/evolution reactions (ORR/OER) and hydrogen evolution reactions (HER) in such devices.

Still further, the present invention provides the use of the energy storage or energy storage and conversion device in a system selected from automobile, power quality, engine starting, energy storage in photovoltaic, energy storage in windmills, medical system, mobile propulsion system, military electronics, transportation system, commercial electronics, consumer electronics, portable electronics, audio system and consumer appliance.

EXAMPLES

Example 1A

Figure 5:
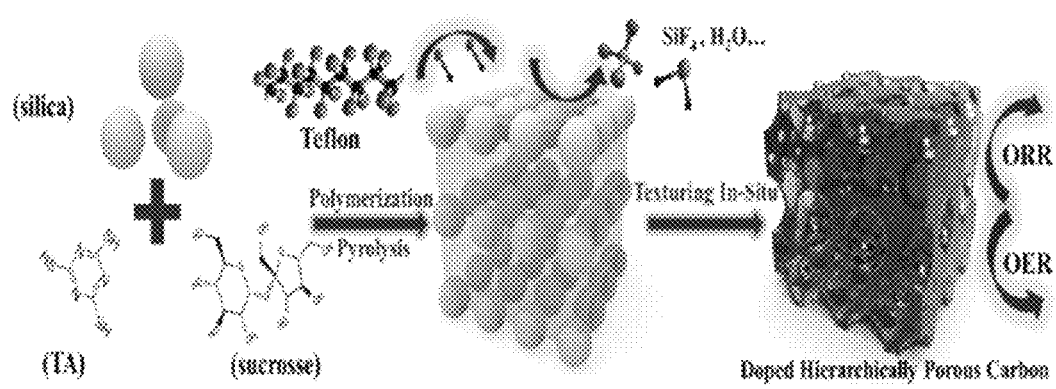
FIG. 5 is a schematic illustration of a method of the present invention for preparing a hierarchically doped porous carbon material. The sucrose as carbon source and trithiocyanuric acid (TA) as dopant source were polymerized in the presence of silica as pore-generating agent followed by the addition of the etching agent precursor Teflon. The mixture was heated to allow for carbonization/pyrolysis and for an in-situ texturing process, which resulted in N, S dually-doped as well as O enriched hierarchically micro-, meso-, and macroporous carbon material especially suitable as catalyst for ORR/OER.

Preparation of Hierarchically Porous Doped Carbon Materials of the Present Invention The fabrication of hierarchically porous N, S dually-doped carbon materials was achieved by mixing silica spheres embedded in polymerized and cross-linked carbon source and dopant source together with Teflon powder (5 µm), followed by a direct pyrolysis procedure (FIG. 5). The Teflon powder can decompose into tetrafluoroethylene when subject to high temperatures under inert atmosphere, which will react with the generated $H_2O$ during the polymerization of sucrose as carbon source to release HF and then to etch the $SiO_2$ in-situ (Conesa, J. and Font, R., Polym. Eng. Sci. 41, 2137-2147, 2001, Singh D. K. et al., Angew. Chem. Int. Ed. 55, 2032-2036, 2016).

More specifically, the hierarchically porous N, S dually-doped carbon material (CNS) was synthesized using as a hard template method. Typically, 1 g silica powder (fumed, particle size ca. 0.2-0.3 µm, Sigma-Aldrich) was dispersed into 30 mL DI water, followed by addition of 1 g sucrose, 1 g trithiocyanuric acid (TA) and 0.1 g sulfuric acid (96-97 wt.-%). This pre-mixture was then sonicated for 10 min and heated up to 100° C. for liquid evaporation. The remaining solid was then kept at 160° C. for 10 h to polymerize the sucrose and cross-link the TA monomers. The weight percent of the $SiO_2$ within the mixture was determined by Thermal gravimetric analysis (TGA). A certain amount of the obtained powder was then finely grinded and mixed uniformly with an excess amount of Teflon powder (5 µm) ($SiO_2$:Teflon=1:12, weight ratio), which was subjected to the heating step with a pre-heating to 600° C. for 1 h and further a main heating to different eventual temperatures (800-1100° C.) for 3 h under Ar atmosphere with an identical ramp rate of 5° C./min. The resulting powder can be directly used as catalyst. The samples are named as T-CNS, where T stands for the temperatures of the main heating also named "pyrolysis temperature" (800-1100° C.).

Example 1B

Physicochemical Characterization of the Carbon Material Prepared in Example 1A

The crystal structure of the catalyst was identified by a Bruker D2 Phaser X-ray diffractometer with Cu Kα radiation (λ=0.15418 nm) operating at 30 kV and 10 mA, respectively. Raman scattering measurements were performed with a multichannel modular triple Raman system (Renishaw Co.) with confocal microscopy at room temperature using the 633 nm laser. The morphology and microstructure of the samples were revealed by a JEOL-2001F field-emission TEM, and the accessory EELS was used to determine to composite elements. XPS analyses were conducted on an ESCALAB 250 photoelectron spectroscopy (Thermo Fisher Scienctific) at $1.2 \times 10^{-9}$ mbar using Al Kα X-ray beam (1486.6 eV). The XPS spectra were charge corrected to the adventitious C 1s peak at 284.5 eV. TGA were carried out on a TA # SDT Q600 analyser at 30-800° C. with an $O_2$ flow of 40 mL/min. The nitrogen adsorption and desorption isotherms were characterized using a Micrometrics ASAP 2020 analyzer. Pore size distribution and specific surface area were obtained via Barrett-Joyner-Halenda (BJH) and Brunauer-Emmett-Teller (BET) methods from adsorption branch of the isotherm, at a relative pressure range of P/P0=0.06-0.25.

Thermal gravimetric (TG) analyses (FIG. 1G) revealed that the silica templates were totally removed during the pyrolysis reaction, leaving a pure doped carbon material enriched with N and S as well as the residual O atoms as evinced by the survey X-ray photoelectron spectroscopy (XPS) spectra (FIG. 1A). In the C-TA-$SiO_2$ mixture in FIG. 1G, the sharp weight loss starting around 220° C. is assumed be result from the oxidation of the TA molecules, while a further gradual weight loss initiates from ca. 290° C. stems from the oxidation of the partially polymerized sucrose. The residual particles are the introduced $SiO_2$, which has a weight percent of 42%. When excess Teflon powder was mixed with the C-TA-$SiO_2$ mixture, the $SiO_2$ can be etched in-situ during the pyrolysis reaction under inert atmosphere.

Figure 1B:
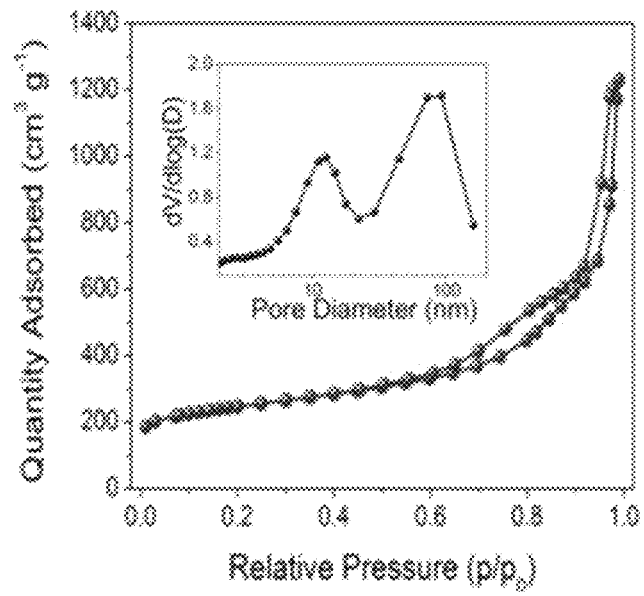
FIG. 1B shows the $N_2$ adsorption/desorption isotherms of the representative hierarchically porous N, S dually-doped carbon material which a pyrolysis temperature of 1100° C. (referenced as "1100-CNS"). The inset shows the pore size distribution derived from adsorption branch.
Figure 1C:
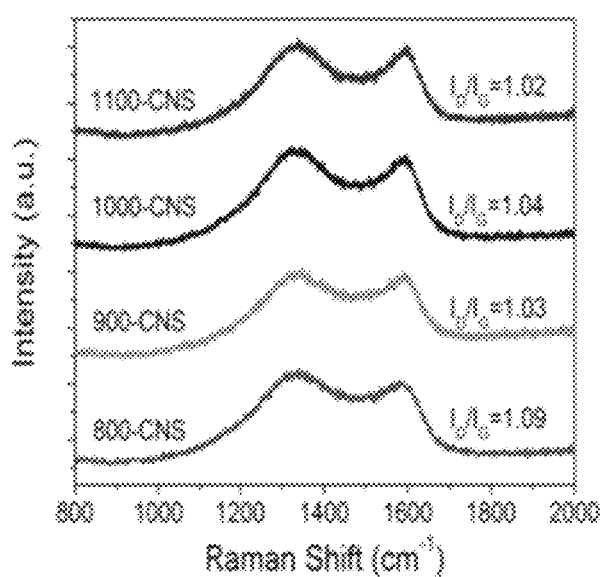
FIG. 1C shows the Raman spectra of the prepared hierarchically porous N, S dually-doped carbon materials, the relative ID/IG ratios are also listed.
Figure 1D:
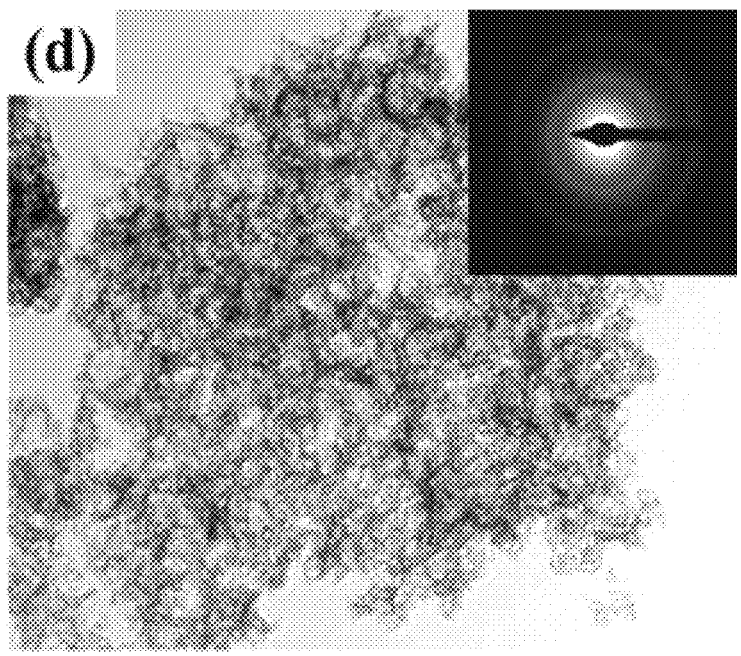
FIG. 1D shows the TEM images of 1100-CNS. The inset shows the SAED patterns (scale bar: 200 nm).
Figure 1E:
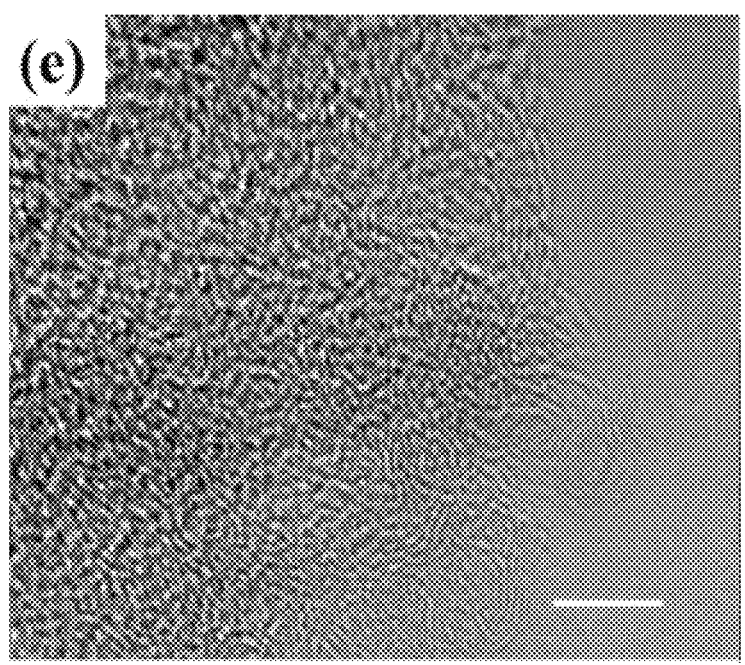
FIG. 1E shows HRTEM images with the micro-texture of 1100-CNS, scale bar: 5 nm.
Figure 1F:
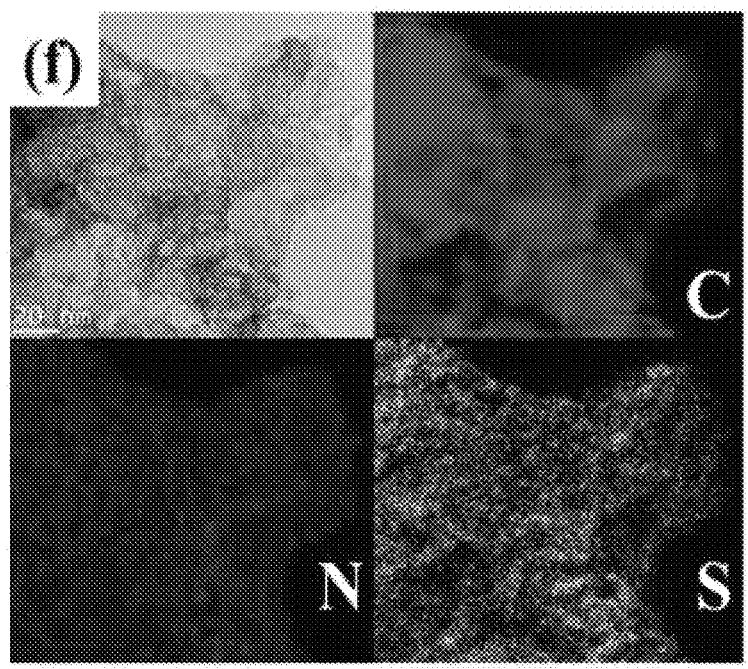
FIG. 1F shows an EELS element mapping of different elements within 1100-CNS.
Figure 1G:
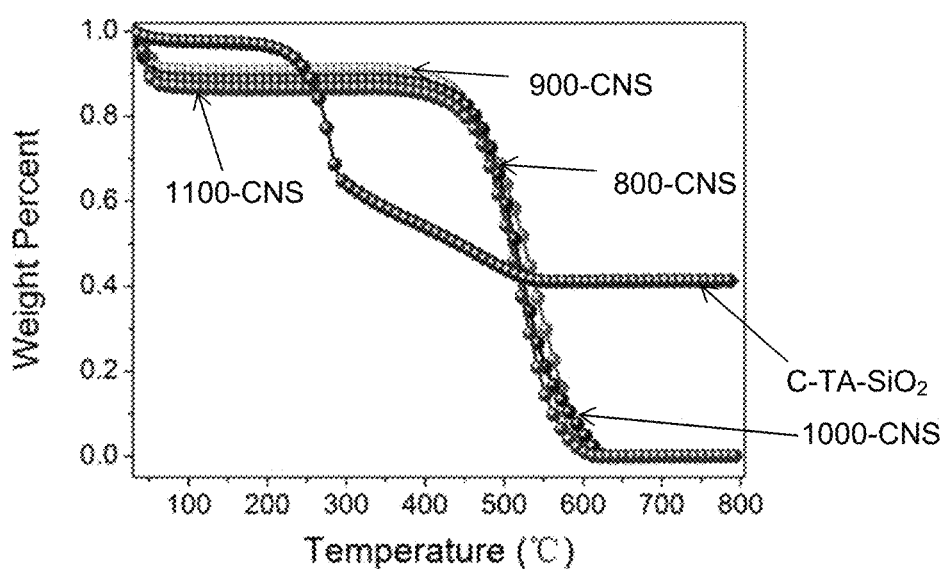
FIG. 1G shows the thermal gravimetric analyses of the different prepared hierarchically porous N, S dually-doped carbon materials as well as the un-pyrolyzed mixture of sucrose, TA and $SiO_2$ (marked as C-TA-$SiO_2$) in $O_2$ flow. Ramp rate, 5° C./min; $O_2$ flow, 40 mL/min.
Figure 1H:
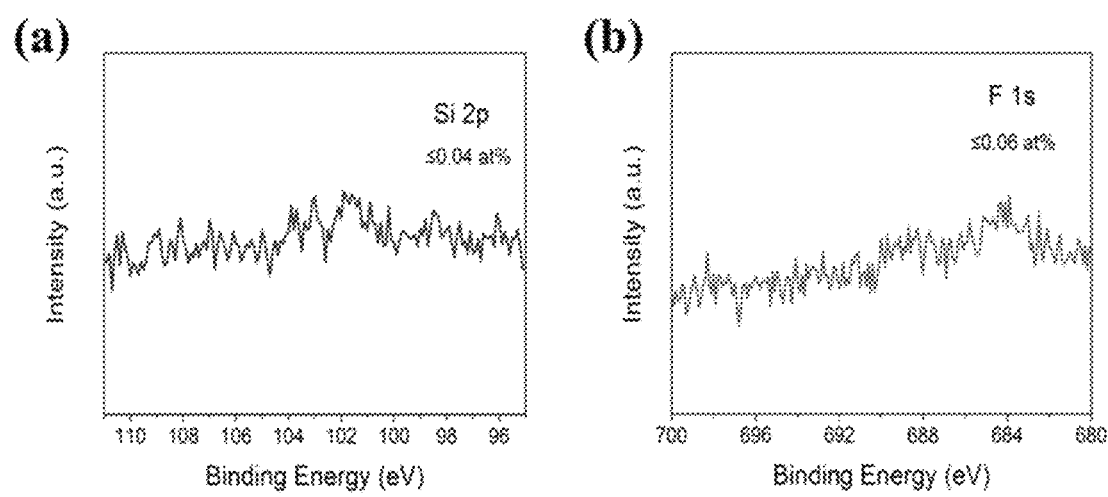
FIG. 1H shows high-resolution XPS spectra of the (a) Si 2p and (b) F 1 s core level.
Figure 1I:
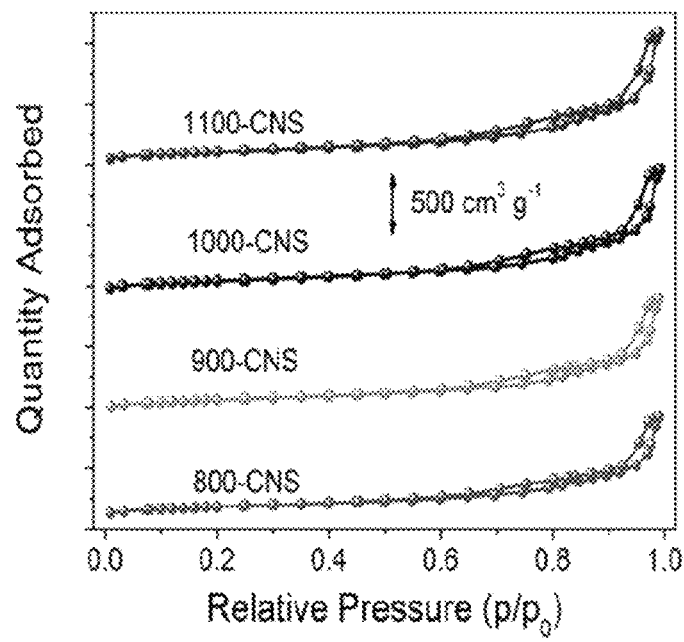
FIG. 1I shows $N_2$ adsorption/desorption isotherms of the different prepared hierarchically porous N, S dually-doped carbon materials.
Figure 1J:
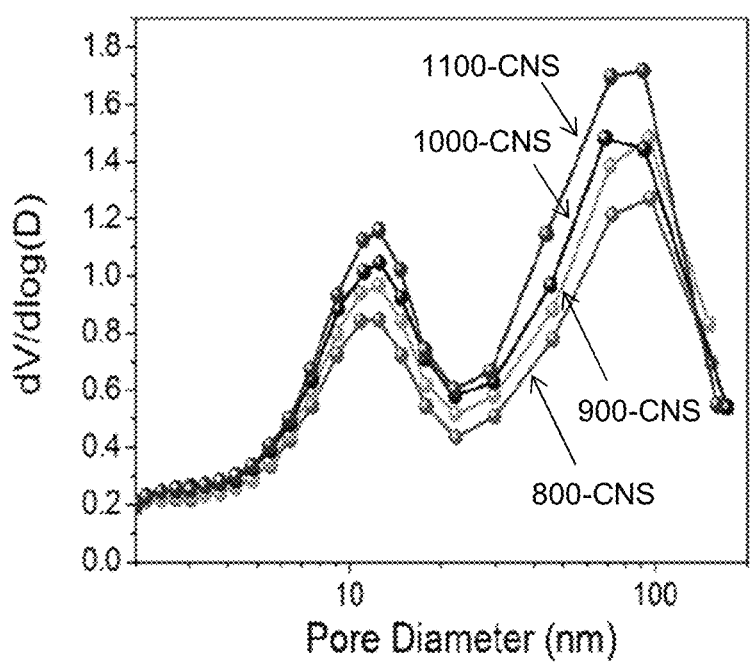
FIG. 1J shows the pore diameter distribution of the different prepared hierarchically porous N, S dually-doped carbon materials.

As shown in FIG. 1G, all the pyrolyzed samples, i.e. samples subjected to the heating step/pyrolysis reaction of the present invention show a complete weight loss in oxygen flow above 600° C., indicating the total removal of $SiO_2$. To check the possible residual Si and F impurities within the pyrolyzed carbon samples, XPS element analysis has been further conducted. The possible impurity elements of Si and F were also reviewed by the fine XPS scans and their contents are found to be extremely low (0.04 at % for Si and 0.06 at % for F, see FIG. 1H), owing reasonably to the fact that the gaseous $SiF_4$ species from the etching reaction can be carried away by the carrier gas (Singh D. K. et al., Angew. Chem. Int. Ed. 55, 2032-2036, 2016). More significantly, the as-prepared carbon material according to the present invention also features a high specific surface area with hierarchical porous structures (FIGS. 1I and 1J, Table 1).

TABLE 1

Porous structural characteristics and elemental compositions of different samples (two-step synthesized samples are marked as 900-HF-XX (C for bare carbon, CNS for N, S dually-doped carbon); 900-teflon-C is the one-step pyrolyzed bare carbon material)

| Sample | $S_{BET}$ m² g⁻¹ | $S_{micro}$ m² g⁻¹ | $V_{tol}$ cm³ g⁻¹ | $V_{micro}$ cm³ g⁻¹ | C | O | N | S | N + S |
|---|---|---|---|---|---|---|---|---|---|
| | | | | | \multicolumn{5}{c}{Element Ratio (wt.-%)} |
| 800-CNS | 624 | 220 | 1.403 | 0.106 | 87.59 | 2.78 | 4.83 | 4.8 | 9.63 |
| 900-CNS | 749 | 321 | 1.606 | 0.157 | 89.38 | 2.9 | 3.3 | 4.41 | 7.71 |
| 1000-CNS | 801 | 347 | 1.762 | 0.169 | 90.29 | 3.5 | 2.59 | 3.62 | 6.21 |
| 1100-CNS | 840 | 364 | 1.877 | 0.177 | 93.64 | 3.15 | 1.33 | 1.88 | 3.21 |
| 900-teflon-C | 849 | 335 | 1.995 | 0.163 | 96.38 | 3.62 | — | — | — |
| 900-HF-C | 763 | 169 | 2.316 | 0.079 | 95.86 | 4.14 | — | — | — |
| 900-HF-CNS | 528 | 45 | 2.186 | 0.017 | 90.19 | 3.42 | 3.09 | 3.30 | 6.39 |

Figure 1K:
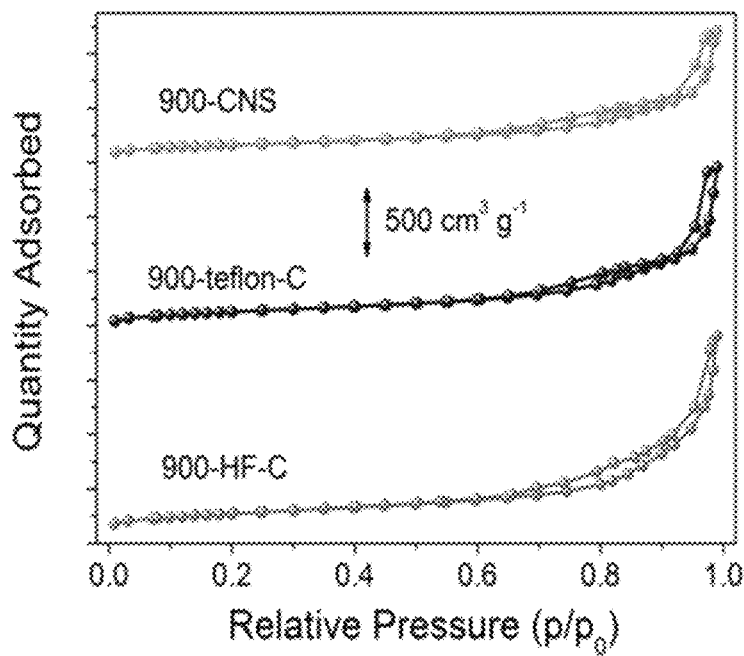
FIG. 1K shows $N_2$ adsorption/desorption isotherms of 900-CNS (pyrolysis temperature 900° C.), of "one-step" etched porous carbon (900-Teflon-C) (i.e. carbonization of the carbon source and etching of the pore-generating agent in one step) and conventional two-step etched carbon with separated carbonization of the carbon source and etching of the pore-generating agent (900-HF—C). A moderate temperature (900° C.) was selected to avoid the possible peculiar deviation of the parameters at higher temperatures.
Figure 1L:
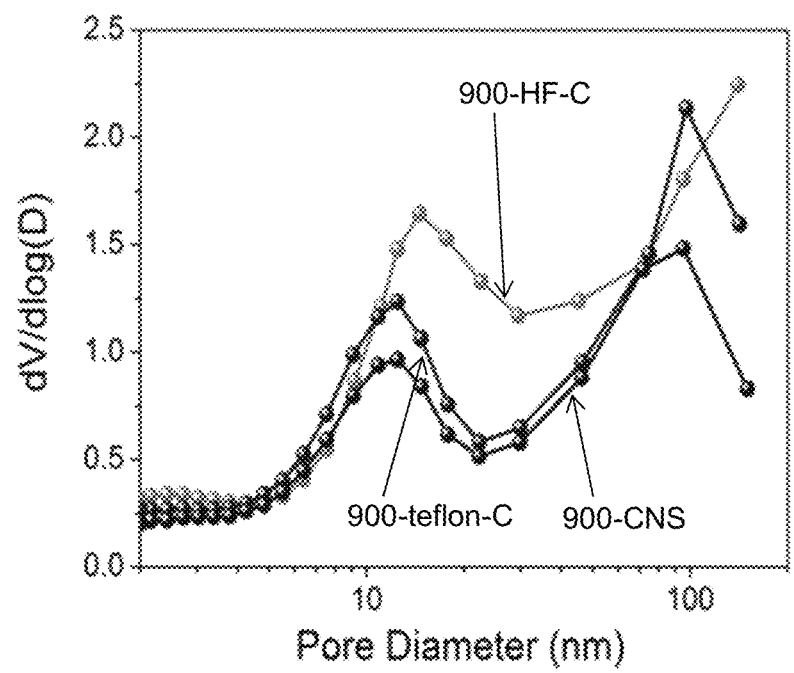
FIG. 1L shows the pore size distribution plots of 900-CNS, 900-Teflon-C and 900-HF-C.

For instance, the representative sample with a main heating/pyrolysis temperature of 1100° C. (marked as 1100-CNS) shows a Brunauer-Emmet-Teller (BET) surface area ($S_{BET}$) of 830 m² g⁻¹ and a total pore volume of 1.88 cm³ g⁻¹, contributed by a remarkable amount of macropores centered at 90 nm, mesopores around 11 nm as well as a substantial quantity of micropores (FIG. 1B, Table 1). Here the macropore is evidently introduced by silica as pore-generating agent. The meso- and microcavities is very probably caused by the leaving small molecules ($H_2O$, $CO_2$, $NH_3$, $H_2S$, $CS_2$ et al.), as porogens, during the carbonization of sucrose and the decomposition of the TA monomers (Zhang, J. et al., Energy Environ. Sci. 4, 675-678, 2011, Liang, J., et al., Angew. Chem. Int. Ed. 51, 3892-3896, 2012). This also accounts for the observed pyrolysis temperature-dependent surface areas of different samples (Table 1). A further insight into this in-situ cavitation process was acquired via comparison of the porous architectures from the conventional two-step (first carbonization with silica template followed by HF etching in a second step) synthesized carbon and the present one. Interestingly, it is found that the Teflon etched bare carbon profiles a larger surface area yet with smaller pore diameters compared with the two-step prepared porous carbon (FIGS. 1K and 1L). The t-plot analyses indicate that the enlarged surface area fraction stems almost from the micropores, though it is compromised to some extent by the shrinkage of larger pores especially in the macropore range (FIGS. 1K and 1L, Table 1). It should be noted that the Teflon starts decomposing at 450° C. and completes generally below 600° C. (Conesa, J. and Font, R., Polym. Eng. Sci. 41, 2137-2147, 2001, Singh D. K. et al., Angew. Chem. Int. Ed. 55, 2032-2036, 2016) during which the silica will be severely etched concomitantly. The further increase of pyrolysis temperature will, though partially reserve, cause the shrinkage of the void pores, which is attested by the $N_2$ adsorption/desorption measurements. On the other hand, however, the removal of the silica species will also exempt the coupled silica-carbon interface, which facilitates the decomposition of the surface oxygen-containing carbon to create additional micropores (Singh D. K. et al., Angew. Chem. Int. Ed. 55, 2032-2036, 2016). This explains why the Teflon etched carbon features larger surface area compared with that of the one synthesized from the two-step method. The incorporation of N and S heteroatoms leads to a decrease in the surface area of the doped carbon skeleton despite the etching methods used, but the present in-situ approach renders obvious larger surface area and more active species (Table 1), both are desired characters as ORR catalysts. Taken together, the present invention enables a facile fabrication of N, S dually-doped and O enriched, hierarchical micro-, meso- and macro-porous carbon material, which avoids the post-synthetic treatment and simultaneously retains large surface area in conjunction with abundant dopant species.

Figure 1M:
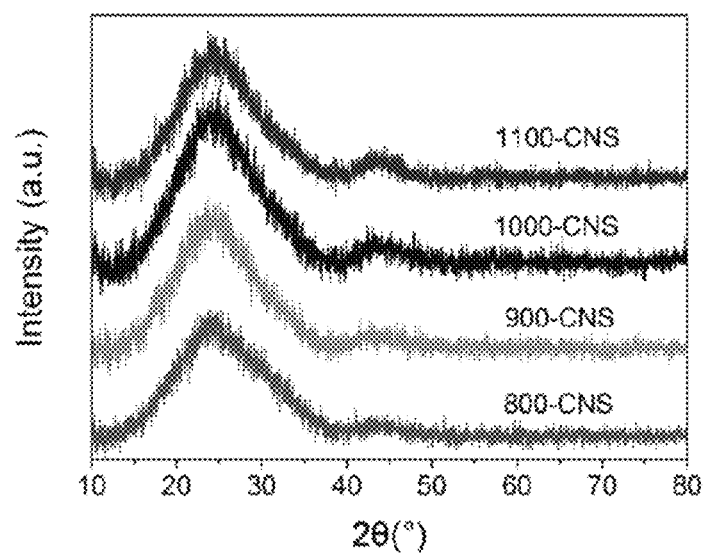
FIG. 1M shows XRD patterns of the different prepared hierarchically porous N, S dually-doped carbon materials.
Figure 1N:
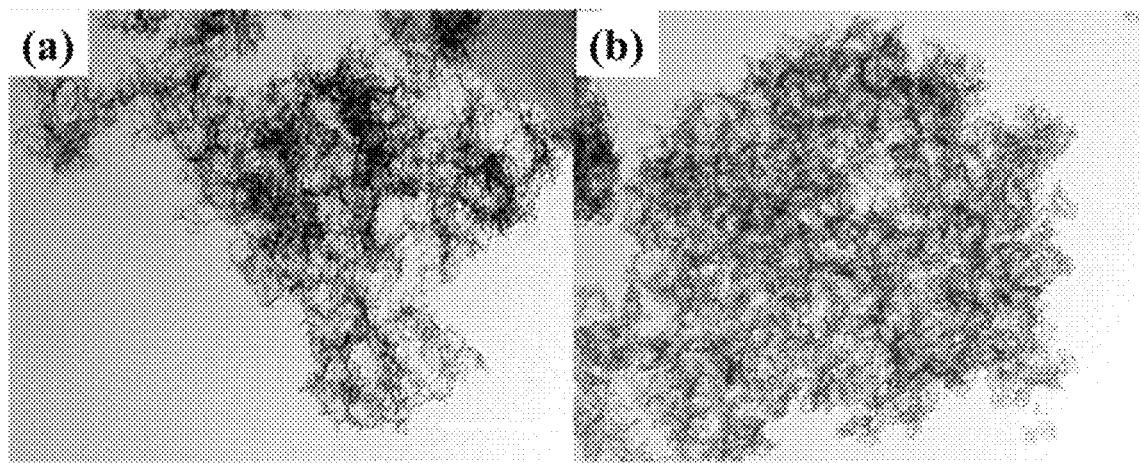
FIG. 1N shows TEM images of (a) porous carbon etched with HF and (b) 1100-CNS prepared according to a method of the present invention with in-situ Teflon etching.
Figure 1O:
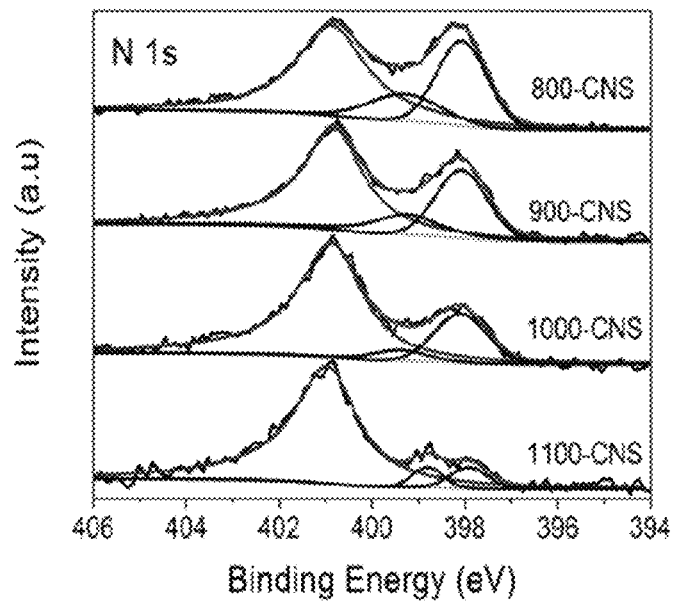
FIG. 1O shows the high resolution N 1 s XPS spectra of the prepared hierarchically porous N, S dually-doped carbon materials.
Figure 1P:
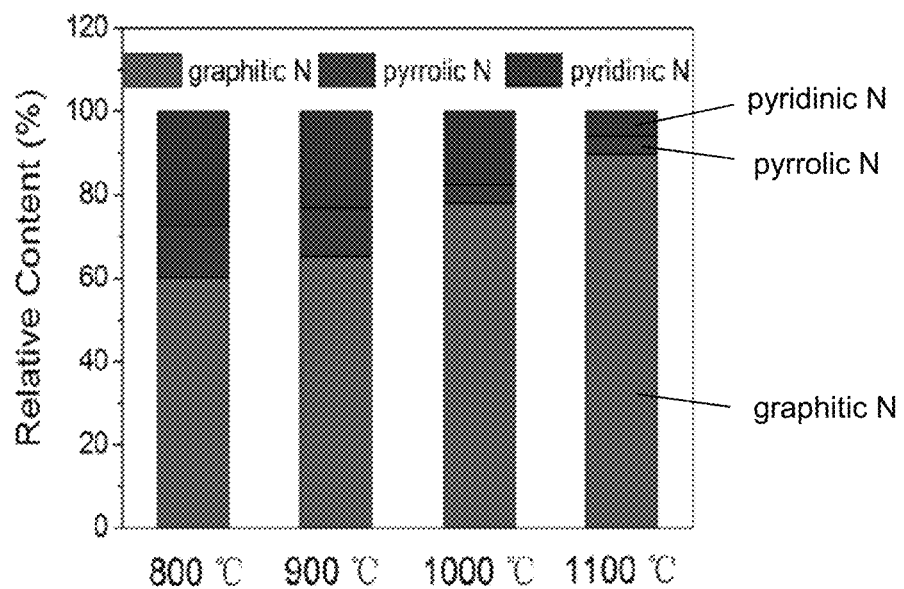
FIG. 1P is a bar chart diagram showing the relative content ratios of graphitic, pyrrolic and pyridinic nitrogen species within the different prepared hierarchically porous N, S dually-doped carbon materials.
Figure 1Q:
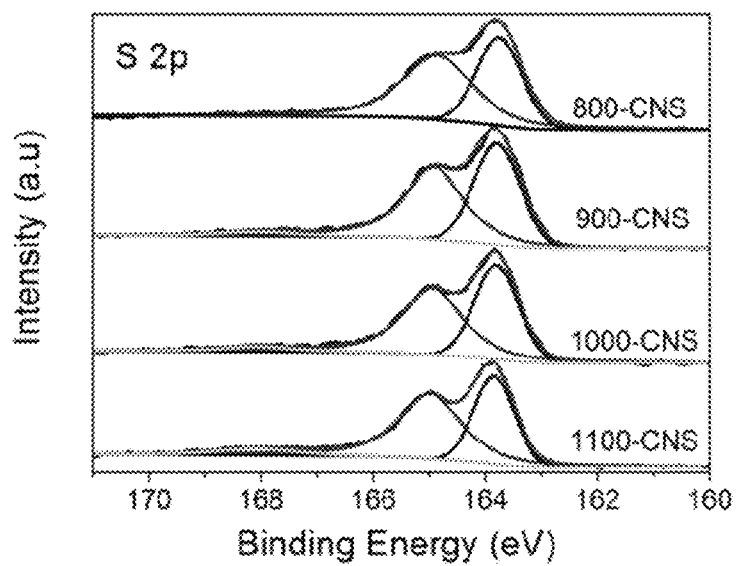

The intensity of X-ray diffraction (XRD) peaks of the (002) and (101) crystalline planes of the prepared carbon, locating at 23.8° and 44.0°, respectively (Liu, Q. Adv. Mater. 28, 3000-3006, 2016), exhibits a gradual increase at elevated pyrolysis temperatures (FIG. 1M), suggesting an enhanced graphitization degree. Raman spectra in FIG. 1C exhibit two distinct bands at 1345 cm⁻¹ and 1590 cm⁻¹, assigning to the defective/disordered $sp^a$ hybridized carbon (D band) and the crystallized graphitic $sp^2$ carbon (G band), separately (Liang, J. et al., Angew. Chem. Int. Ed. 51, 11496-11500, 2012). The $I_D/I_G$ relative ratios shrink from 1.09 to 1.02 when increasing the temperature from 800° C. to 1100° C., also confirming a better graphitic nature of N, S dually-doped carbon skeleton at higher temperature. The morphology and structure of the carbon material were then examined by transmission electron microscope (TEM) analyses. As shown in FIG. 1D, a lot of low contrast holes with diverse sizes are readily to be observed throughout the whole skeleton of the heteroatom doped carbon, suggesting the featured hierarchical porosity. Besides, the sizes of macro cavities within the representative 1100-CNS sample are found to be generally smaller compared with those of HF etched carbon (FIG. 1N), which also well accords with the $N_2$ sorption results. Selected area electron diffraction (SAED) patterns (inset in FIG. 1D) suggest the doped carbon is poorly crystallized as a whole, while high resolution TEM (HRTEM) observation (FIG. 1E) discloses that the sample still profiles some lamellar wrinkles on the thin edge of the carbon matrix, which are very likely to stem from some crumped well-graphitized carbon (Yang, J. et al., Adv. Mater. 28, 4606-4613, 2016). The accessory electron energy loss spectroscopy (EELS) element mapping confirms the primarily existence of N and S dopants, which are distributed uniformly in the carbon skeleton and could ensure a better electrocatalytic activity. XPS measurements were then conducted to quantify the chemical states and bonding configurations of the heteroatoms. The fine N 1s spectrum can be best deconvoluted into three typical atomic bonded peaks at 398.1 eV, 399.3 eV and 400.9 eV, corresponding to the pyridinic N, pyrrolic N and the graphitic N in the carbon matrix, respectively (FIGS. 1O and 1P) (Niu, W. et al., J. Am. Chem. Soc. 137, 5555-5562, 2015). The sulfur dopant presents two dominant doublet S 2p peaks at 163.8 eV and 165.0 eV (FIG. 1Q), both can be attributed to the S atoms in the C—S—C configuration (Yu, X. et al., Adv. Energy Mater. 6, 1501492, 2016). Increasing the temperature resulted in the gradual leaching out of the doped N and S species (Table 1), whilst higher temperature favors the formation of graphitic N due to its higher stability compared with the other two N species (FIGS. 1O and 1P) (Yang, H. B. et al., Sci. Adv. 2, e1501122, 2016, Niu, W. et al., J. Am. Chem. Soc. 137, 5555-5562, 2015). Noteworthy is that despite of the trade-off relationship between the conductivity required high pyrolysis temperature and the inevitable concurrently dopant leaching effect, the dopant concentration even in the 1100° C. pyrolyzed sample is still nominally considerable (N+S, 3.21 wt %) meriting from the method of the present invention. The doped N, with its larger electronegativity, will result in the redistribution of the charge densities in the carbon framework and make the adjacent carbon atoms positively charged, which then activate the carbon for ORR (Dai, L. et al., Chem. Rev. 115, 4823-4892, 2015, Gong, K. et al., Science 323, 760-764, 2009). The S dopant, though is less effective in charge polarization due to its similar electronegativity (x=2.58) compared with carbon (x=2.55), can render high spin densities within the surrounding carbon atoms and thus also boosts the ORR activity (Dai, L. et al., Chem. Rev. 115, 4823-4892, 2015, Liang, J. et al., Angew. Chem. Int. Ed. 51, 11496-11500, 2012). A synergic N and S co-doping, with a considerable concentration, is therefore expected to fundamentally warrant a competent ORR activity.

Example 1C

ORR and OER Bi-Functional Performances of the Carbon Material Prepared in Example 1A All electrochemical measurements were carried out on a CHI 760D electrochemical workstation integrated with a RRDE-3A rotating ring disk electrode apparatus in a typical 3-eletrode system, in which a glassy carbon electrode (GCE, 3 mm in diameter) loaded with different catalysts was used as working electrode, with a Ag/AgCl (in 3 M KCl) electrode and a Pt mesh as reference and counter electrode, respectively. The recorded potential was converted to a reversible hydrogen electrode (RHE). 0.1 M KOH or 0.1 M HClO$_4$ solution served as the electrolyte for ORR measurements. The loading masses for metal-free catalysts were 140 µg cm$^{-2}$ for alkaline solution and 600 µg cm$^{-2}$ for acidic electrolyte. Pt/C (Alfa Acesar, 20 wt.-%) with a loading mass of 140 µg cm$^{-2}$ was used for reference. All the ORR currents presented in the figures are Faradaic currents, i.e., after correction for the capacitive current. Each catalyst was repeated at least 3 times for the above measurements to exclude possible incidental errors.

The RRDE tests were conducted with a Pt ring surrounded 4 mm diameter GCE. The Pt ring electrode was set at 1.5 V (vs. RHE) to detect the generated HO$_2^-$ species.

The value of n was also calculated through RRDE tests:

$$n = \frac{4i_d}{i_d + \frac{i_r}{N}}$$

the HO$_2^-$ yield was calculated from equation:

$$HO_2^- \% = \frac{200i_r}{N\left(i_d + \frac{i_r}{N}\right)}$$

here $i_d$ and $i_r$ are the disk current and ring current, respectively, and N is the current collection efficiency of the Pt ring and was determined to be 0.37.

Long term stability tests in ORR were conducted by measuring the current changes of the catalyst modified GCE at a fixed potential of 0.7 V (vs. RHE) and a rotation speed of 1600 rpm in O$_2$ saturated electrolyte. The cross-over tolerance tests were performed by comparing the CV curves before and after the addition of 10 vol.-% methanol into the electrolyte.

For OER measurements, the electrolyte was 0$_2$ saturated 0.1 or 1 M KOH solution and the catalyst loading mass was 420 µg cm$^{-2}$ for metal-free sample and 140 µg cm$^{-2}$ for noble-metal materials (Pt/C and IrO$_2$). The LSV curves were obtained at a scan rate of 5 mV s$^{-1}$ and the GCE was rotated at 1600 rpm to alleviate the accumulation of evolved oxygen bubbles on the electrode surface. All the curves were iR corrected unless otherwise stated and in order to get a stable current, the LSV data were collected at the second sweep.

Figure 2A:
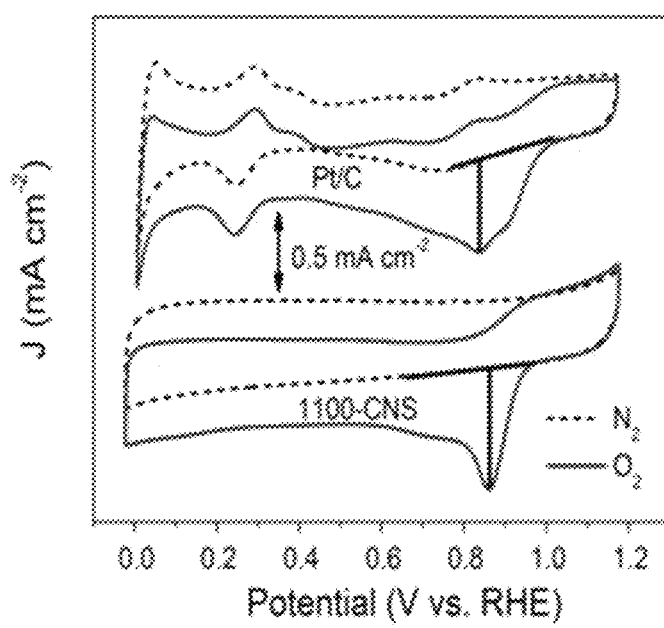
FIGS. 2A through 2F refer to the electrocatalytic ORR performance of the hierarchically porous doped carbon materials prepared according to the present invention in alkaline electrolyte.
Figure 7A:
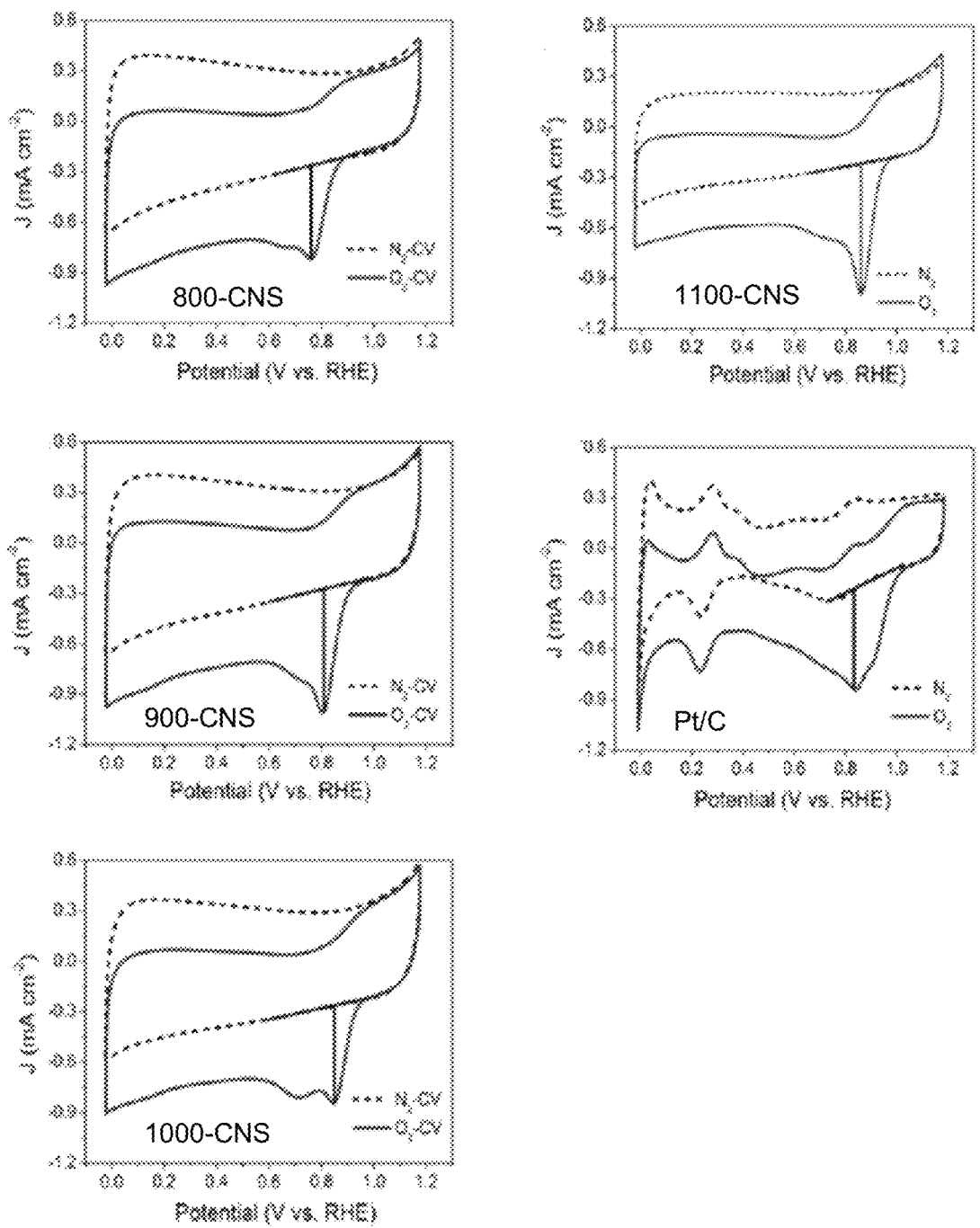
FIG. 7A shows CV curves of different hierarchically porous N, S dually-doped carbon materials prepared according to the present invention and the Pt/C catalyst recorded at 20 mV $s^-$ in $N_2$ and $O_2$ saturated 0.1 M KOH solution.
Figure 7B:
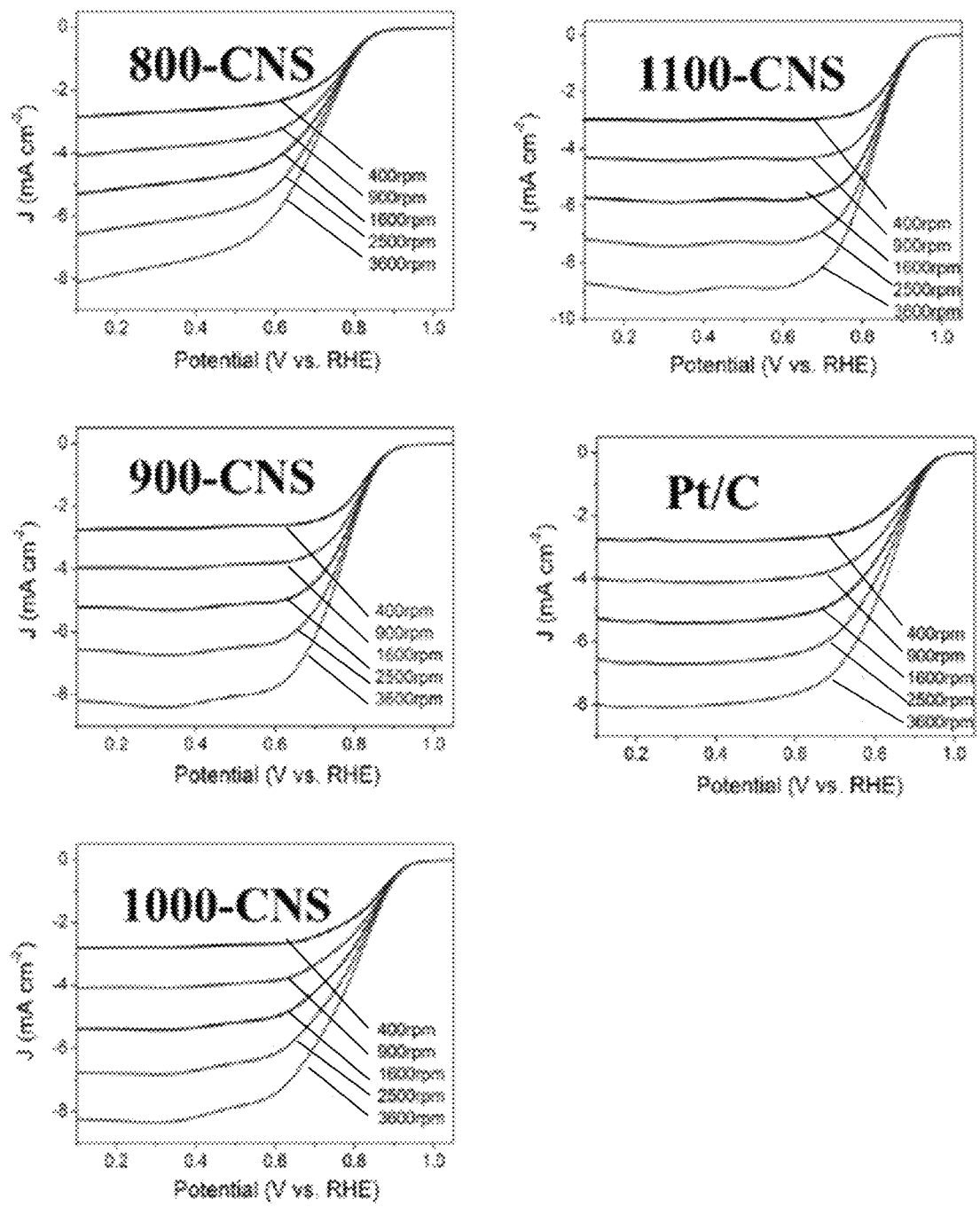
FIG. 7B shows LSV curves of different hierarchically porous N, S dually-doped carbon materials prepared according to the present invention and the Pt/C catalyst at different rotational speeds.
Figure 7C:
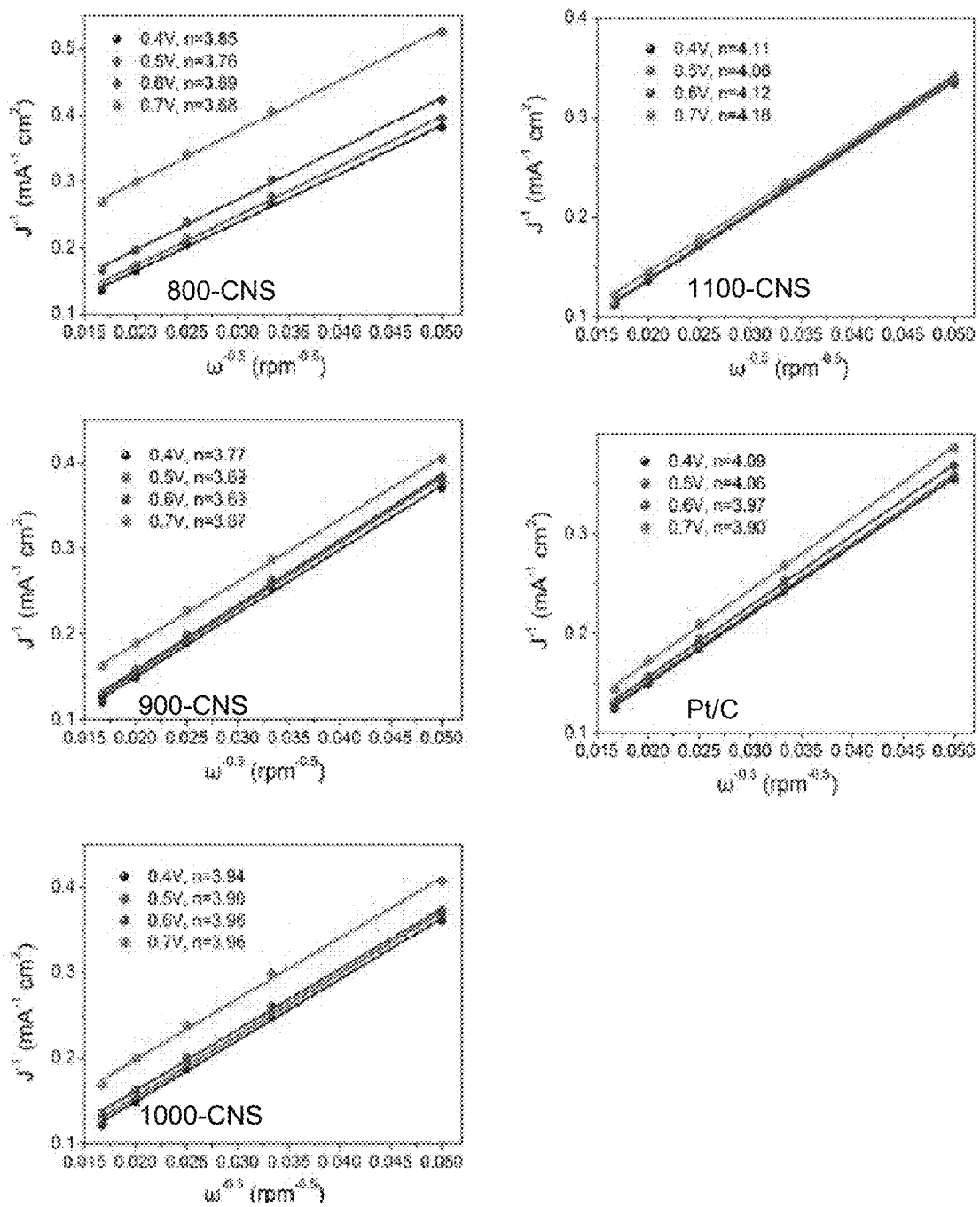
FIG. 7C shows K-L plots of different hierarchically porous doped carbon materials prepared according to the present invention and the Pt/C catalyst at various potentials including the corresponding electron transfer number.

The hierarchically porous doped carbon material obtained can be used directly as a catalyst without further purification or washing. The ORR activity of the pyrolyzed catalysts was first compared by cyclic voltammetric (CV) scans in O$_2$-free/saturated 0.1 M KOH solution. All the metal-free samples give a distinct reduction peaks in O$_2$ purged electrolyte with regard to the N$_2$-saturated system (FIG. 7), suggesting an efficient oxygen process. The best reduction peak potential was afforded by the 1100-CNS one among the four fabricated samples, which reached 0.86 V (vs. reversible hydrogen electrode (RHE), similarly hereinafter) and is even better than the value (0.84 V) from referenced benchmark 20 wt.-% Pt/C catalyst (FIG. 2A). Also, the net reduction current density of the 1100-CNS sample (0.76 mA cm$^{-2}$) at 20 mV s$^-$ is larger than that of the Pt/C catalyst (0.59 mA cm$^{-2}$), suggesting an intrinsic prominent ORR activity of the catalysts of the present invention in alkaline solution. Linear sweep voltammetry (LSV) curves (FIG. 2B) further validate that the 1100-CNS sample profiles an excellent electroactivity with an onset potential of 0.99 V, a half-wave potential (E$_{1/2}$) of 0.85 V together with a limiting current density of 5.8 mA cm$^{-2}$ at 1600 rpm in 0.1 M KOH, all surpass those of other three counterpart samples, which also outperform most of ever-reported advanced metal-free catalysts (Table 2).

TABLE 2

Comparison study of some advanced metal-free ORR catalysts in 0.1M KOH electrolyte

| Catalyst | Loading Mass (mg cm$^{-2}$) | Onset Potential (V vs. RHE) | Half-wave Potential (V vs. RHE) | Limiting-Current Density @1600 rpm (mA cm$^{-2}$) | Reference |
|---|---|---|---|---|---|
| N-doped carbon nanotube arrays | — | 0.97 | 0.84 | 5.6 | Science 2009, 323, 760 |
| C3N4@mesoporous carbon | 0.28 | 0.87 | 0.75 | 3.7 | J. Am. Chem. Soc. 2011, 133, 20116 |
| N-graphene QDs | 0.28 | 0.76 | 0.65 | 2.7 | J. Am. Chem. Soc. 2012, 134, 15 |
| B, N-graphene | 0.28 | 0.86 | 0.68 | 5.2 | Angew. Chem. Int. Ed. 2013, 52, 3110 |
| Te, P-doped porous carbon fiber | 0.1 | 0.89 | 0.79 | 5.7 | J. Am. Chem. Soc. 2014, 136, 14385 |
| N-doped meso/micro porous carbon | 0.1 (0.5) | 0.92 (0.92) | 0.85 (0.87) | 5.8 (5.8) | Nature Commun. 2014, 5, 4973 |
| N, S-doped grapheme | 0.35 | 0.87 | 0.61 | 1.8 | Adv. Mater. 2014, 26, 6186 |
| N, P-doped mesoporous carbon | 0.15 | 0.94 | 0.85 | 4.3 | Nature Nanotech. 2015, 10, 444 |
| N-doped hierarchical porous carbon | 0.29 | — | 0.85 | 5.4 | ACS Nano 2016, 10, 4364 |
| N-doped porous carbon | 0.29 | 0.98 | 0.88 | 5.5 | Adv. Energy Mater. 2016, 1502389 |
| N-doped porous carbon nanosheets | 0.2 | 0.9 | 0.77 | 5.79 | Adv. Mater. 2016, 28, 5080 |
| N, S-doped carbon nanosheets | 0.2 | 0.92 | 0.77 | 4.3 | Nano Energy 2016, 19, 373 |
| N-doped porous carbon fiber | 0.1 | 0.97 | 0.82 | 4.7 | Adv. Mater. 2016, 28, 3000 |
| N, P-doped CGHNs | 0.3 | 0.94 | 0.82 | 5.6 | Adv. Mater. 2016, 28, 4606 |
| N-doped grapheme | 0.6 | 0.92 | 0.84 | 5.5 | Sci. Adv. 2016, 2: e1501122 |
| N, S-doped porous carbon | 0.14 (0.42) | 0.99 (0.99) | 0.85 (0.88) | 5.8 (6.4) | This invention |

Figure 2B:
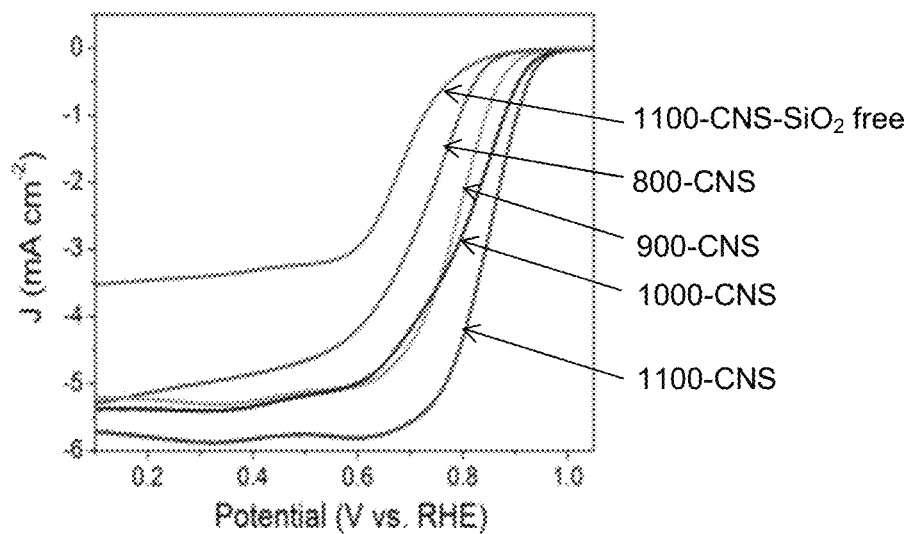
Figure 2C:
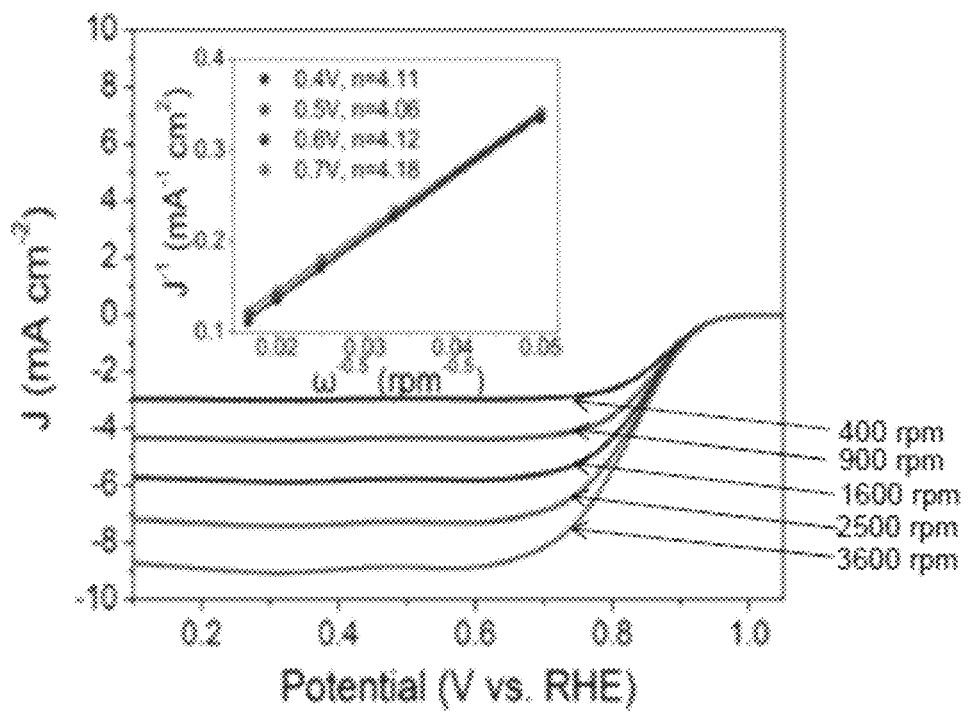
Figure 2D:
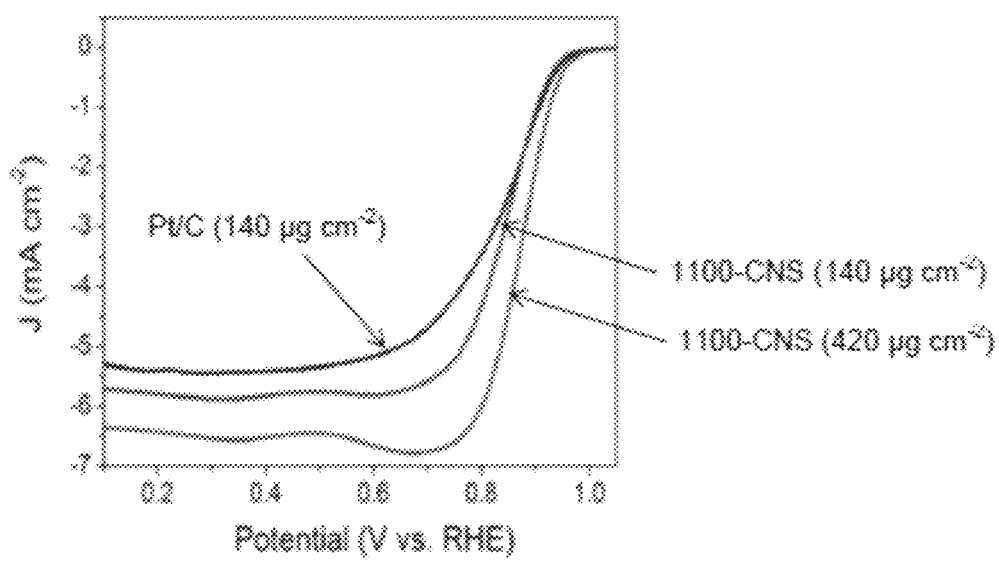
Figure 2E:
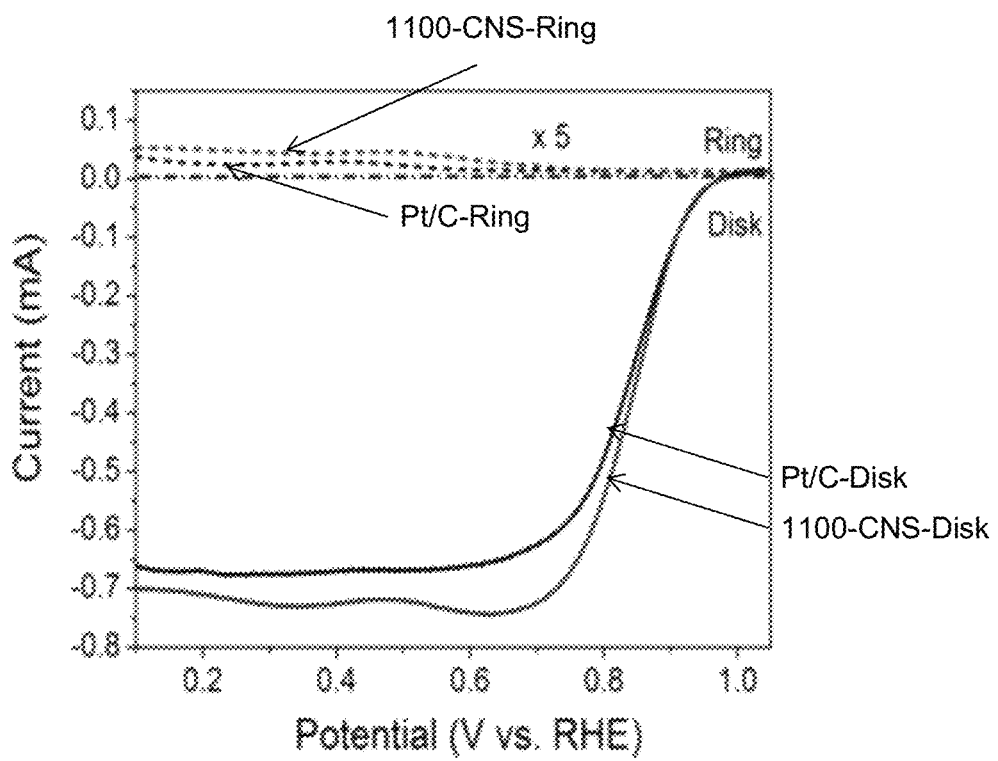
Figure 2F:
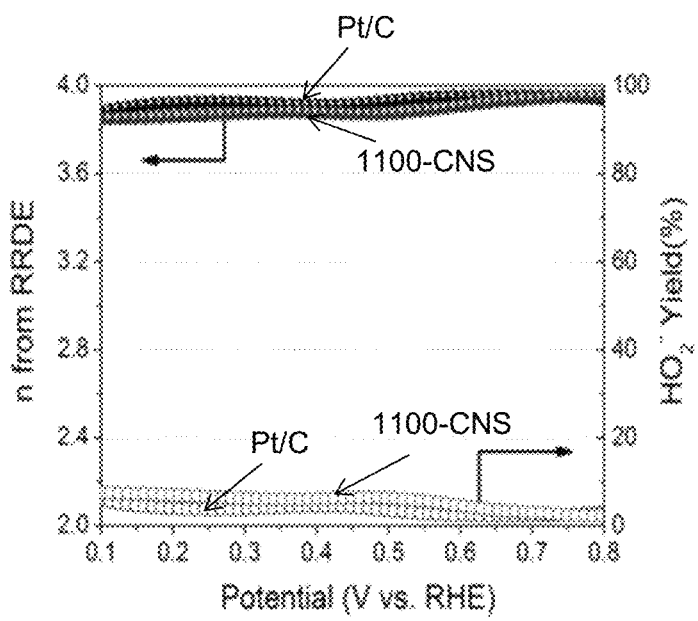
Figure 8:
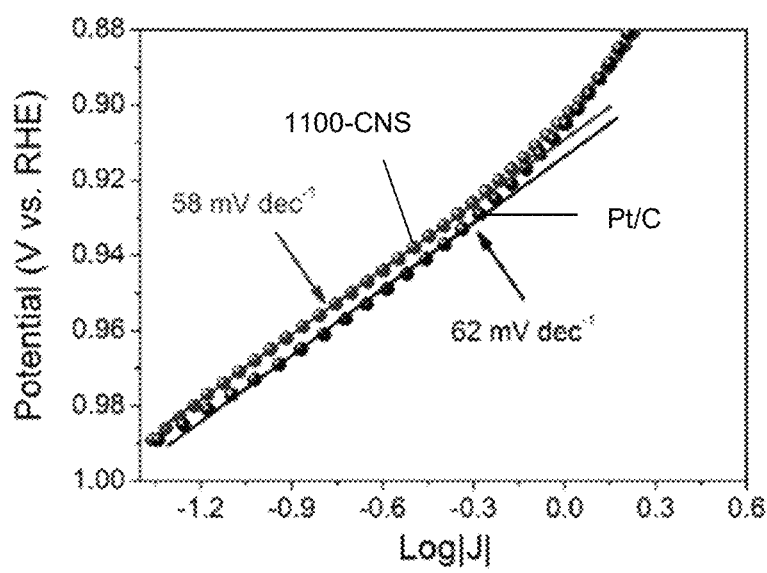
FIG. 8 shows Tafel plots of 1100-CNS and the Pt/C catalyst in 0.1 M KOH at 1600 rpm.
Figure 9:
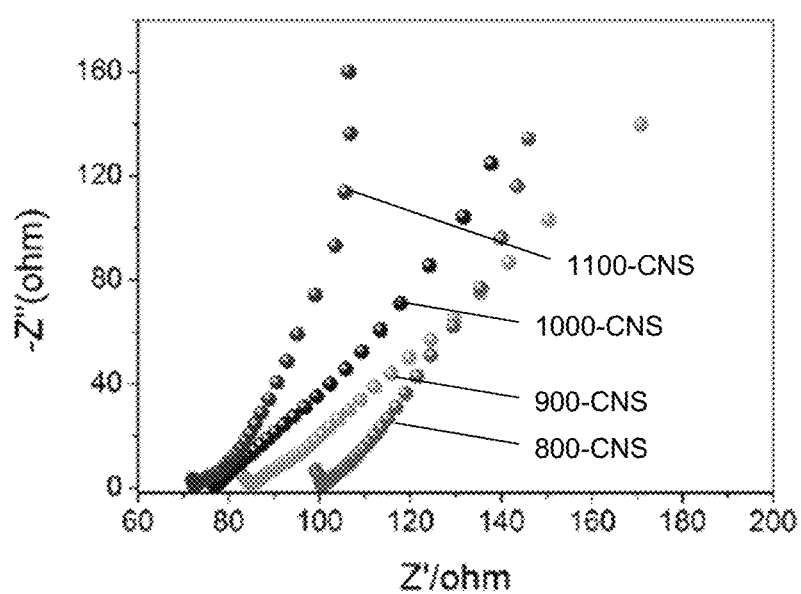
FIG. 9 shows electrochemical impedance spectra of different hierarchically porous doped carbon materials prepared according to the present invention in alkaline solution at 1600 rpm and 0.7 V (vs. RHE).
Figure 10:
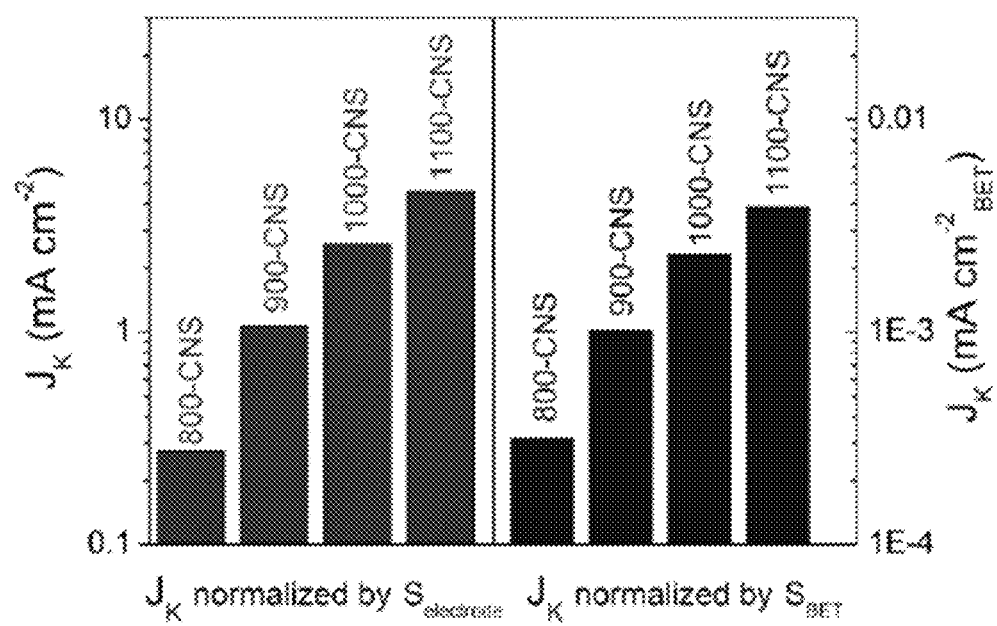
FIG. 10 is a comparison of kinetic limiting currents ($J_Ks$) of different hierarchically porous N, S dually-doped carbon materials prepared according to the present invention as obtained within the mixed kinetic-diffusion region (0.85 V vs. RHE) upon normalization of the electrode area and the BET surface area.
Figure 11:
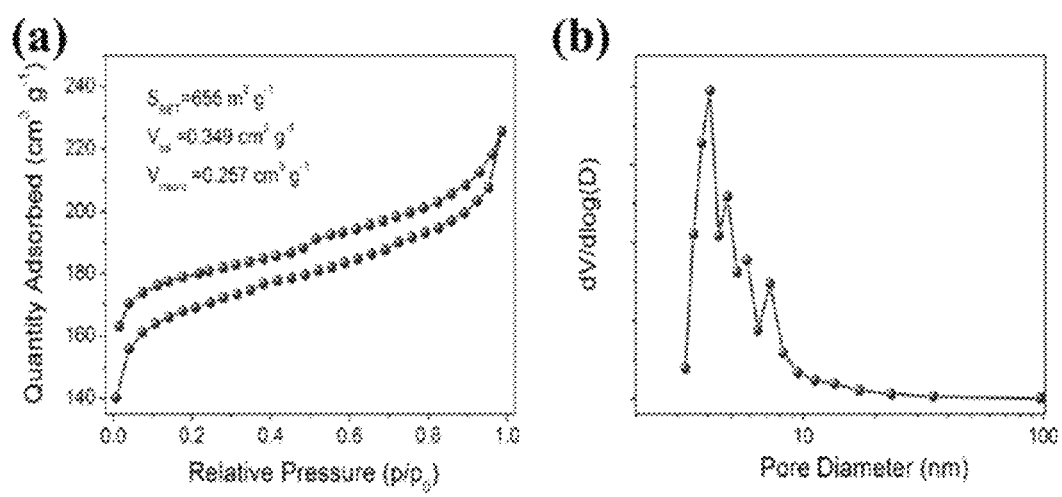
FIG. 11 shows (a) $N_2$ adsorption/desorption isotherms and (b) the pore diameter distribution of the macropore-free (1100-CNS—$SiO_2$ free) sample. The micropore volume was determined by the t-plot analysis.

The excellent ORR activity of the 1100-CNS catalyst was also reviewed by the rotating disk electrode (RDE) tests at different rotation speeds. As presented in FIGS. 2C, 2D and FIG. 7, the 1100-CNS sample delivers higher current densities at different speeds than all the counterparts pyrolyzed at other temperatures, which also remarkably exceed those afforded by the benchmark Pt/C catalyst upon the same catalyst loading mass. The Koutecky-Levich (K-L) plot of the sample features good linearity and consistent slope (inset in FIG. 2C), suggesting a first-order kinetic during the ORR which is correlated with the concentration of $O_2$ in the electrolyte (Niu, W. et al., J. Am. Chem. Soc. 137, 5555-5562, 2015). The Tafel slope recorded from the 1100-CNS sample at 1600 rpm was determined to be only 58 mV dec$^{-1}$, smaller than the Pt/C sample (62 mV dec$^{-1}$, FIG. 8), denoting that the rate-determining step in ORR is the first electron reduction of oxygen. Considering the economic feasibility of the metal-free catalysts of the present invention, the catalyst loading mass of 1100-CNS has been further increased to 420 μg cm$^{-2}$, yielding a highly promising $E_{1/2}$ of 0.88 V, which is 30 mV more positive than the Pt/C sample. The rotating ring disk electrode (RRDE) tests (FIG. 2E, 2F) uncover that the 1100-CNS sample can implement the ORR with an electron transfer number (n) of ca. 3.85-3.95 per oxygen molecule and a $HO_2^-$ yield generally below 7.3% in a wide potential range (0.1 V-0.8 V) in alkaline solution, both are quite close to those from the Pt/C catalyst. These gauged activity parameters demonstrate the viability of the facile synthesized porous catalyst of the present invention as alternative to noble-metal based ORR catalyzers. The origin of the high reduction activity of the 1100-CNS sample was then explored. Electrochemical impedance spectrum (EIS) (FIG. 9) unravels that the 1100° C. pyrolyzed sample gives the smallest charge transfer resistance among the four doped carbon materials, denoting that the higher conductivity is crucial for efficient interfacial charge delivering. However, higher pyrolysis temperature will also render larger specific surface area in the 1100-CNS sample (Table 1), which could be another reason accounting for the better activity. Then the K-L analysis has been conducted to assess their normalized kinetic current densities ($J_K$s) in the mixed kinetic-diffusion controlled region (Liang, H.-W. et al., Nature Commun. 5, 4973, 2014). As shown in FIG. 10, the $J_K$ value gaps of different catalysts are reduced upon normalization of their surface areas. For example, the difference of $J_K$ value between the most distinct 800-CNS and 1100-CNS samples shrinks from approximately 16.5 to 12.3. These results thus indicate that the surface area can contribute, though partially, to the observed activity differences, and the charge transfer process seems to be more overwhelming considering the four samples share very similar nanoarchitecture and the 1100-CNS sample possesses even lower amount of dopants. Meanwhile, macroporosity plays a decisive role on the observed ORR activity of the 1100-CNS sample. Control experiment on the macropore-free, i.e. pore-generating agent-free (denoted as 1100-CNS—$SiO_2$ free) sample, which has a comparable surface area yet with only micro- and mesoporous structures (FIG. 11), proved that it shows strikingly inferior $E_{1/2}$ and limiting current density compared with the 1100-CNS catalyzer (FIG. 2B, 12).

Figure 12:
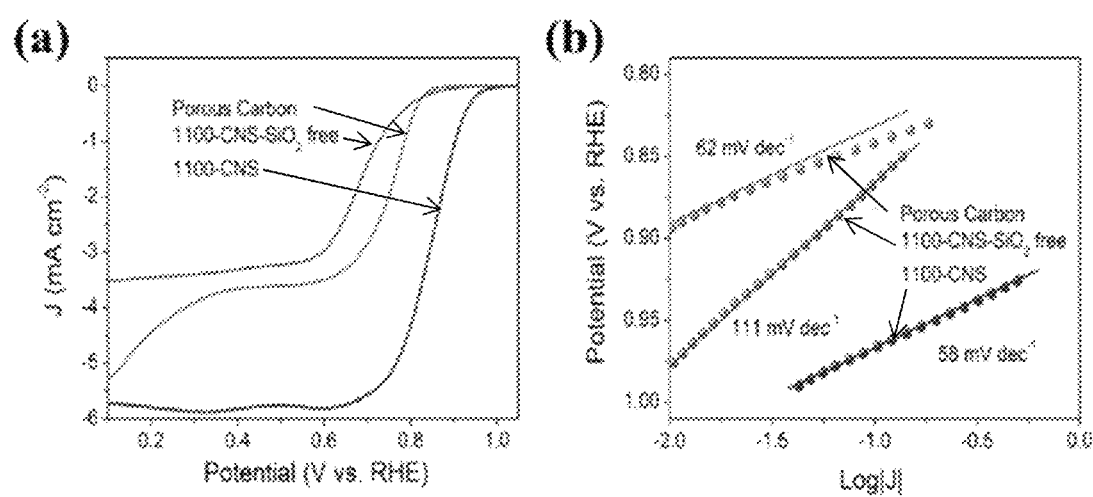
FIG. 12 shows (a) LSV curves of 1100-CNS as well as the controlled bare porous carbon (dopant-free) and 1100-CNS—$SiO_2$ free (macropore-free) samples at 1600 rpm in 0.1 M KOH; (b) shows the corresponding Tafel plots including the Tafel slopes.

The dopant-free sample features a similar Tafel slope compared with the 1100-CNS sample in FIG. 12, suggesting a similar mass transport resistance. However, the ORR onset potential of this bare carbon sample is obvious smaller than the 1100-CNS one, denoting an inferior activity. The macropore-free sample, conversely, gives a comparable onset potential but with remarkably larger Tafel slope, indicating the oxygen transport is hindered by the absence of macropores. Similar results were also evinced by the CV tests and RDE tests at different rotation speeds in FIG. 13. The half-wave potential ($E_{1/2}$) of the 1100-CNS—$SiO_2$ free sample is the smallest among the three samples, whilst the apparent plateau in the LSV curves of the bare carbon sample indicates an inefficient oxygen reduction process via a two-electron (2e−) reaction path. These results therefore validate that both the macropore and the dopant species play crucial role in the prominent ORR activity of the 1100-CNS sample.

Figure 3A:
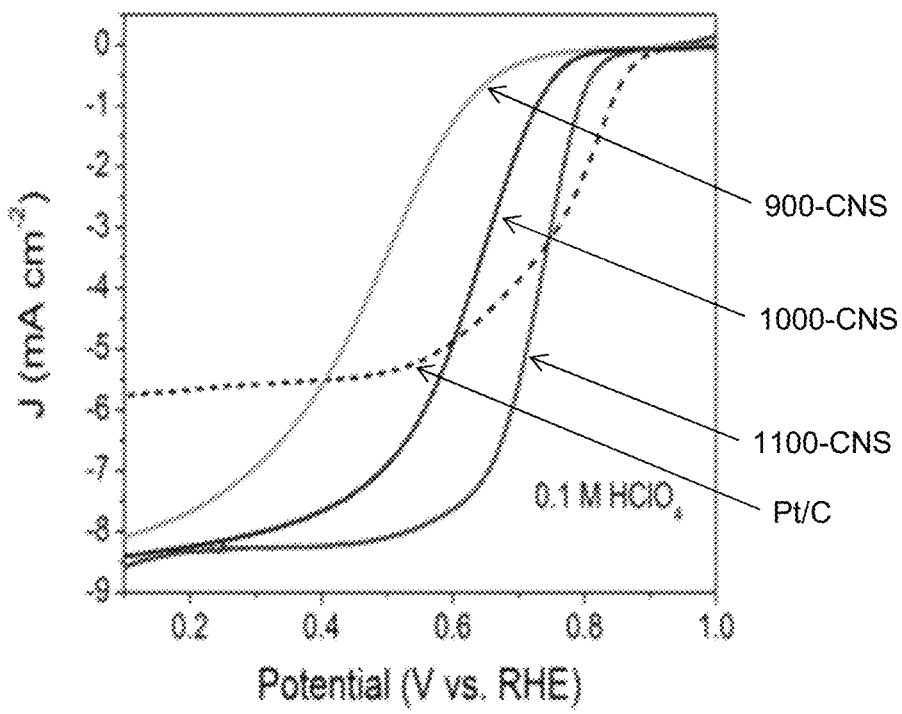
FIGS. 3A through 3F refer to the ORR and OER bi-functional performance of the hierarchically porous N, S dually-doped carbon materials prepared according to the present invention in different electrolytes.
Figure 13:
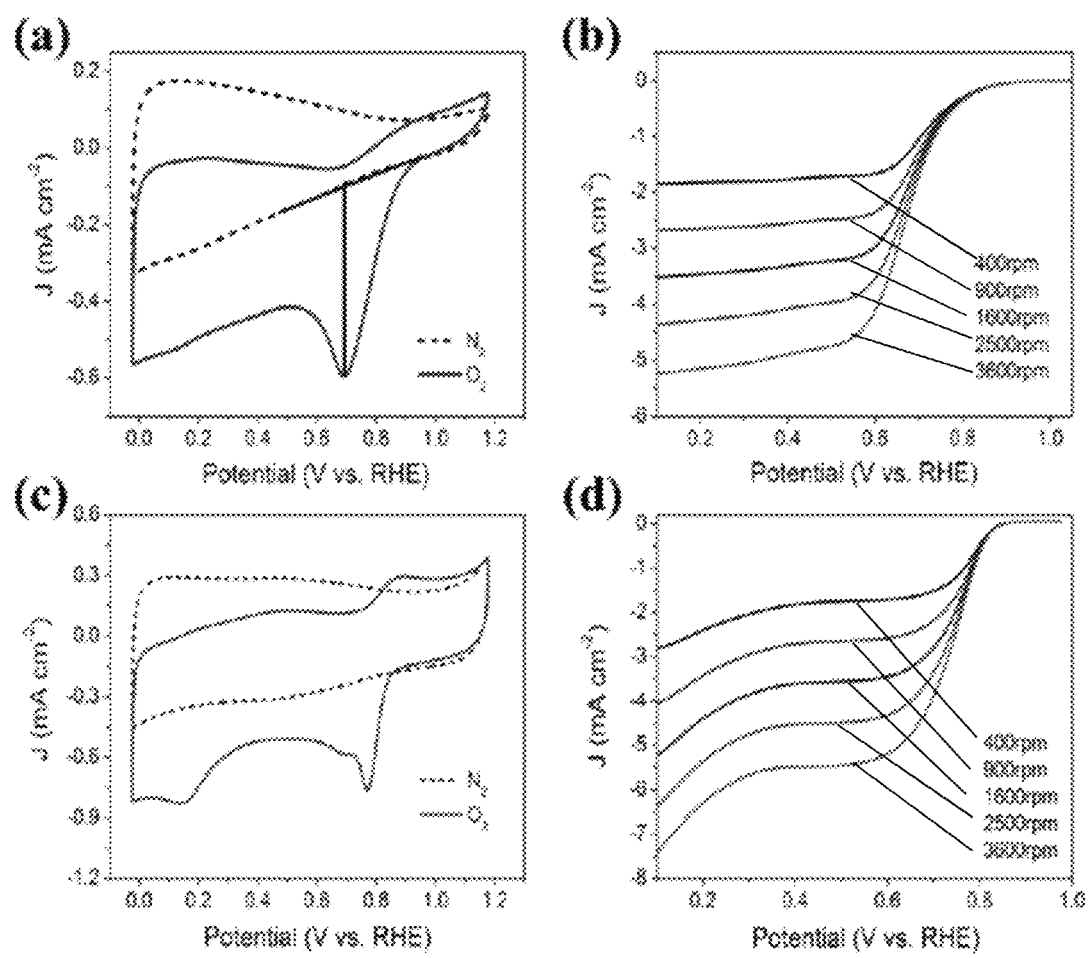
FIG. 13 shows the electrochemical catalytic performance toward ORR in 0.1 M KOH solution of the control samples: CV scans of the (a) macropore-free pyrolyzed (1100-CNS—$SiO_2$ free) sample and (c) bare porous carbon (dopant-free) substrate; LSV curves of the (b) 1100-CNS—$SiO_2$ free and (d) bare carbon samples at different rotating speeds.
Figure 14:
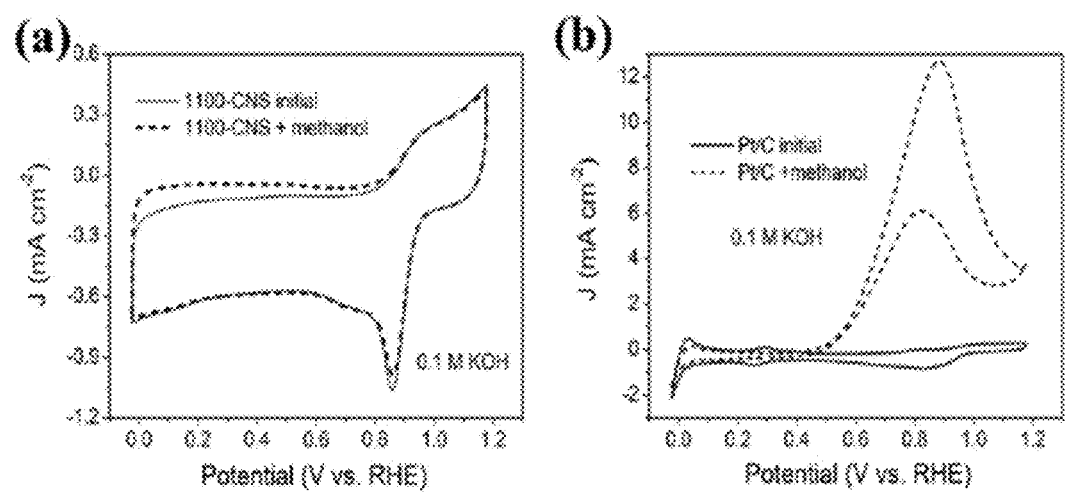
FIG. 14 refers to the cross-over tolerance tests of (a) 1100-CNS and (b) Pt/C sample before and after the addition of 10 vol.-% methanol into 0.1 M KOH. The drastic anodic current of the Pt/C modified electrode resulted from significant methanol oxidation reaction, suggesting the susceptive selectivity of Pt/C catalyst.
Figure 15:
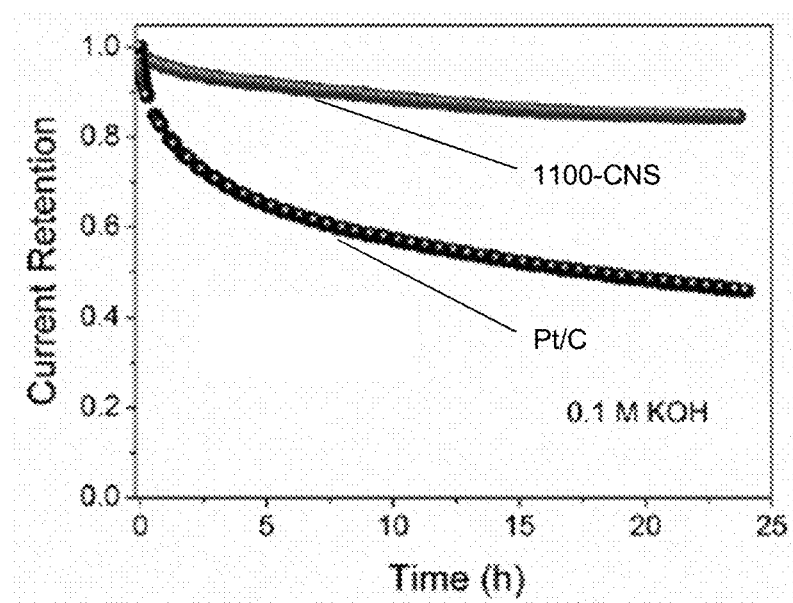
FIG. 15 refers to chronoamperometric durability tests of 1100-CNS and referenced Pt/C sample at 1600 rpm and 0.7 V (vs. RHE) in $O_2$ saturated 0.1 M KOH.

The overall reaction resistance, as unveiled by the corresponding Tafel plot (FIG. 12), confirms that the macropore-free sample suffers from serious oxygen diffusion barrier with regard to the 1100-CNS one. These activity distinctions between the structurally different—however, chemically equivalent-catalysts thus highlight the facilitated mass transport process meriting by the macroporous texture. The dopant factor, on the other hand, was found to affect the reduction pathway as well as the onset potential during ORR (FIGS. 12 and 13). The results imply that it is the bond configurations instead of the concentration of the dopants that determines the eventual ORR activity, similar to previous studies (Yang, H. B. et al., Sci. Adv. 2, e1501122, 2016, Niu, W. et al., J. Am. Chem. Soc. 137, 5555-5562, 2015). Lastly, the reaction selectivity and long-term stability of the 1100-CNS sample in ORR were examined. In sharp contrast to Pt/C catalyst, the metal-free material shows excellent methanol crossover tolerance and much better stability in continuous reduction reaction (FIGS. 14 and 15). In a 24 h amperometric i-t test at 1600 rpm and 0.7 V potential, the 1100-CNS sample preserved 85% of its initial current, while the Pt/C sample lost over 50% of its activity. The good stability of the hierarchically porous doped carbon materials of the present invention result probably from the high chemical stability of the intimately incorporated heteroatoms and the robustness of the interconnected carbon skeleton, which avoids the detachment and collapse as in the Pt/C system (Pei, Z. et al., J. Mater. Chem. A 4, 12205-12211, 2016). The aforementioned suitable properties also make said carbon materials particularly suitable as efficient and durable ORR catalysts in acidic electrolytes. As shown in FIG. 3A, the one-step pyrolyzed metal-free samples exhibit good activity for oxygen reduction. In specific, the best 1100-CNS sample catalyzes ORR with an onset potential of 0.88 V and a $E_{1/2}$ of 0.73 V in 0.1 M $HClO_4$, both are comparable (about 45 mV negative) to the benchmark Pt/C. The limiting reduction current density reaches 8.3 mA $cm^{-2}$, substantially larger than those reported by other studies with the analogous catalyst loading (Table 3).

TABLE 3

Comparison study of some advanced metal-free and non-noble metal based ORR catalysts in acidic electrolyte

| Catalyst | Loading Mass (mg $cm^{-2}$) | Onset Potential (V vs. RHE) | Half-wave Potential (V vs. RHE) | Limiting-Current Density @1600 rpm (mA $cm^{-2}$) | Electrolyte | Reference |
|---|---|---|---|---|---|---|
| N-doped mesoporous carbon | 0.8 | 0.8 | 0.5 | 4.5 | 0.1M $HClO_4$ | J. Am. Chem. Soc. 2011, 133, 206 |
| N-carbon spheres | 0.25 | 0.65 | 0.42 | 5.5 | 0.5M $H_2SO_4$ | Adv. Mater. 2013, 25, 998 |
| N-doped meso/micro porous carbon | 0.5 | 0.84 | 0.72 | 4.6 | 0.5M $H_2SO_4$ | Nature Commun. 2014, 5, 4973 |
| N-doped mesoporous carbon sheet | 0.6 | 0.75 | 0.57 | 5 | 0.5M $H_2SO_4$ | Angew. Chem. Int. Ed. 2014, 53, 1570 |
| N, P-doped mesoporous carbon | 0.45 | 0.82 | 0.62 | 5.6 | 0.1M $HClO_4$ | Nature Nanotech. 2015, 10, 444 |
| N, P-doped CGHNs | 0.6 | 0.9 | 0.68 | 5.7 | 0.1M $HClO_4$ | Adv. Mater. 2016, 28, 4606 |
| Fe—N—C | 0.1 | 0.82 | 0.6 | 6 | 0.1M $HClO_4$ | J. Am. Chem. Soc. |

TABLE 3-continued

Comparison study of some advanced metal-free and non-noble metal based ORR catalysts in acidic electrolyte

| Catalyst | Loading Mass (mg cm$^{-2}$) | Onset Potential (V vs. RHE) | Half-wave Potential (V vs. RHE) | Limiting-Current Density @1600 rpm (mA cm$^{-2}$) | Electrolyte | Reference |
|---|---|---|---|---|---|---|
| Fe$_3$C—C | 0.6 | 0.9 | 0.73 | 5.5 | 0.1M HClO$_4$ | 2014, 136, 11027 Angew. Chem. Int. Ed. 2014, 53, 3675 |
| Fe$_3$C—CNT | 1.2 | 0.89 | 0.63 | ca. 6 | 0.5M H2SO$_4$ | J. Am. Chem. Soc. 2015, 137, 1436 |
| Fe—N—C nanofiber | 0.6 | 0.84 | 0.62 | 5 | 0.5M H2SO$_4$ | Angew. Chem. Int. Ed. 2015, 54, 8179 |
| N, S-doped porous carbon | 0.6 (0.6) | 0.88 (0.88) | 0.73 (0.72) | 8.3 (8.2) | 0.1M HClO$_4$ (0.5M H$_2$SO$_4$) | This invention |

Figure 3B:
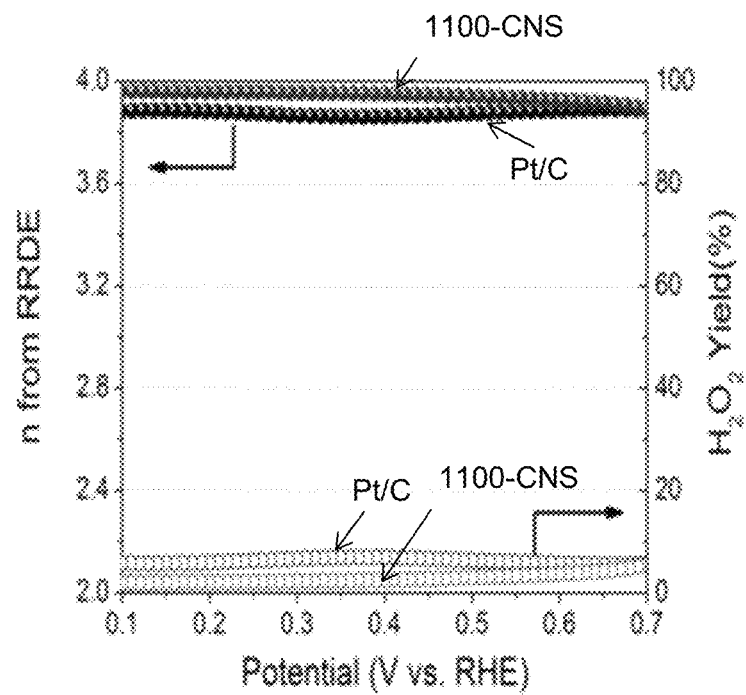
Figure 3C:
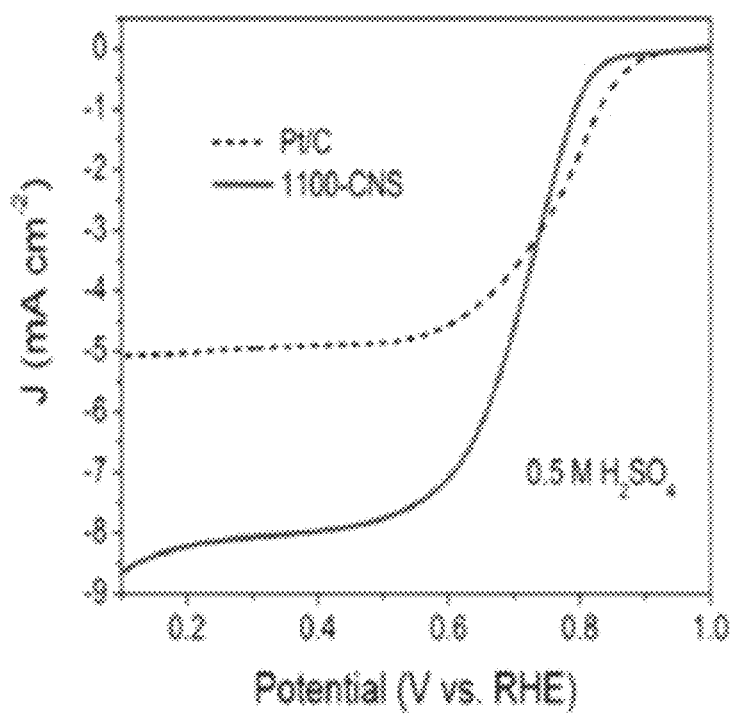
Figure 16:
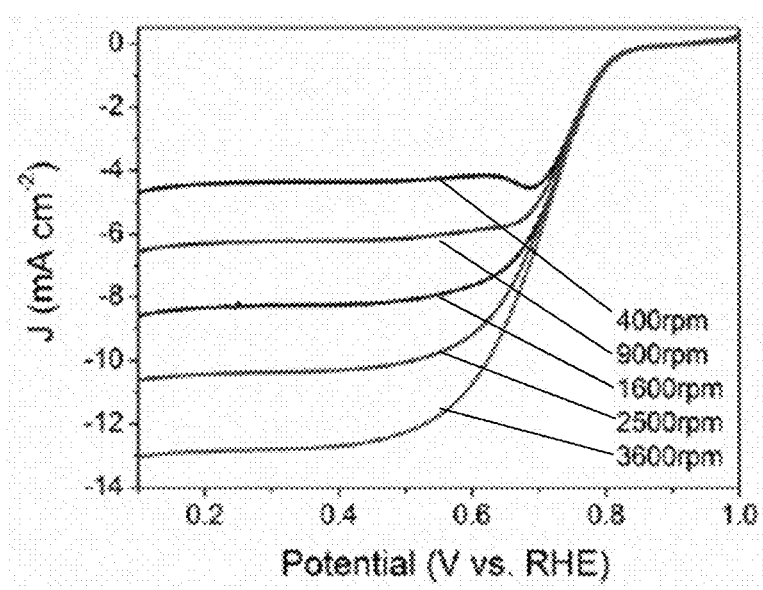
FIG. 16 shows LSV curves of 1100-CNS in 0.1 M $HClO_4$ at different rotational speeds.
Figure 17:
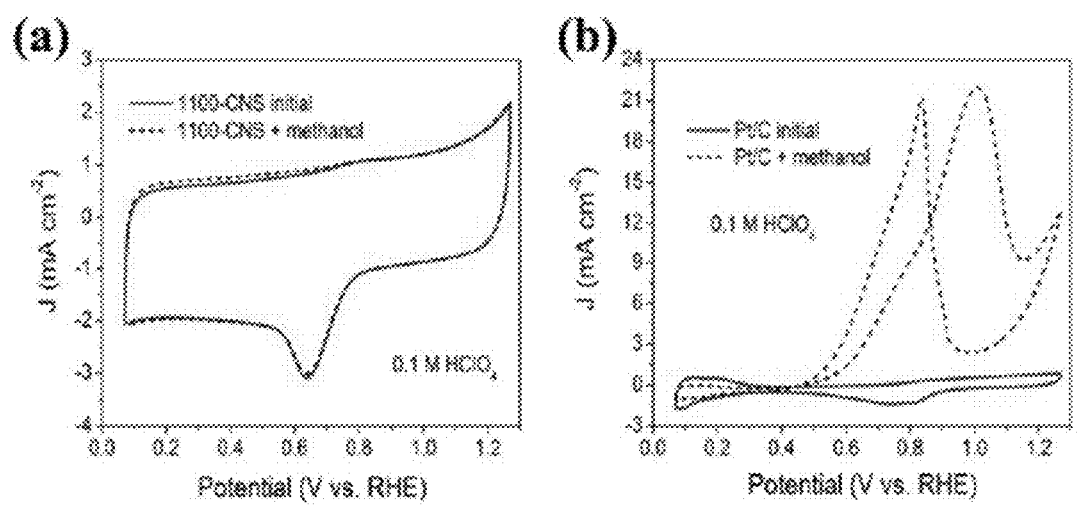
FIG. 17 refers to cross-over tolerance tests of (a) 1100-CNS and (b) Pt/C sample before and after the addition of 10 vol.-% methanol into 0.1 M $HClO_4$.
Figure 18:
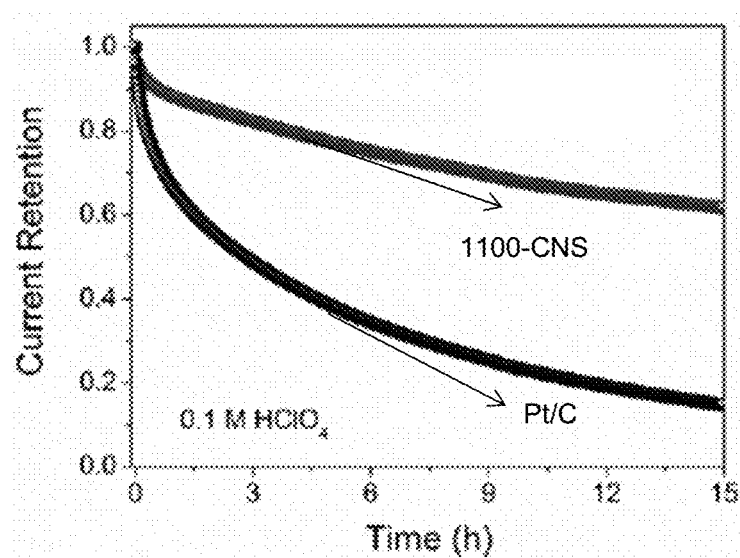
FIG. 18 refers to chronoamperometric durability tests of 1100-CNS and Pt/C sample at 1600 rpm and 0.7 V (vs. RHE) in $O_2$ saturated 0.1 M $HClO_4$.

The sample gives increasing reduction currents at higher rotation speeds (FIG. 16), and the RRDE tests unfold a prominent n value range of 3.89-3.96, corresponding to H$_2$O$_2$ yield of ca. 5.5-2.0%, which is even lower than that from the Pt/C catalyst in a wide potential range (FIG. 3B). In addition, the porous sample also gives excellent ORR activity in 0.5 M H$_2$SO$_4$ (FIG. 3C, Table 3), in which the Pt/C catalyzer shows obvious lower current density in comparison to that in 0.1 M HClO$_4$. It is known that the Pt species are susceptible to the blocking by the bisulfate anions (Masa, J. et al., Angew. Chem. Int. Ed. 54, 10102-10120, 2015), the wide adaptability of the 1100-CNS sample thereby allows using it as a potential ORR catalyst in different proton exchange membrane fuel cells. Moreover, the 1100-CNS sample also profiles much better cross-over tolerance and long-term stability in acidic solution with respect to Pt/C (FIGS. 17 and 18). To date, only a few metal-free catalysts afford good activity and stability in both alkaline and acidic electrolytes. The performance of the sample prepared according to the method of the present invention is even as good as those of the state-of-the-art Fe—N—C non-noble-metal based catalysts in acidic electrolytes (Table 3).

Figure 3D:
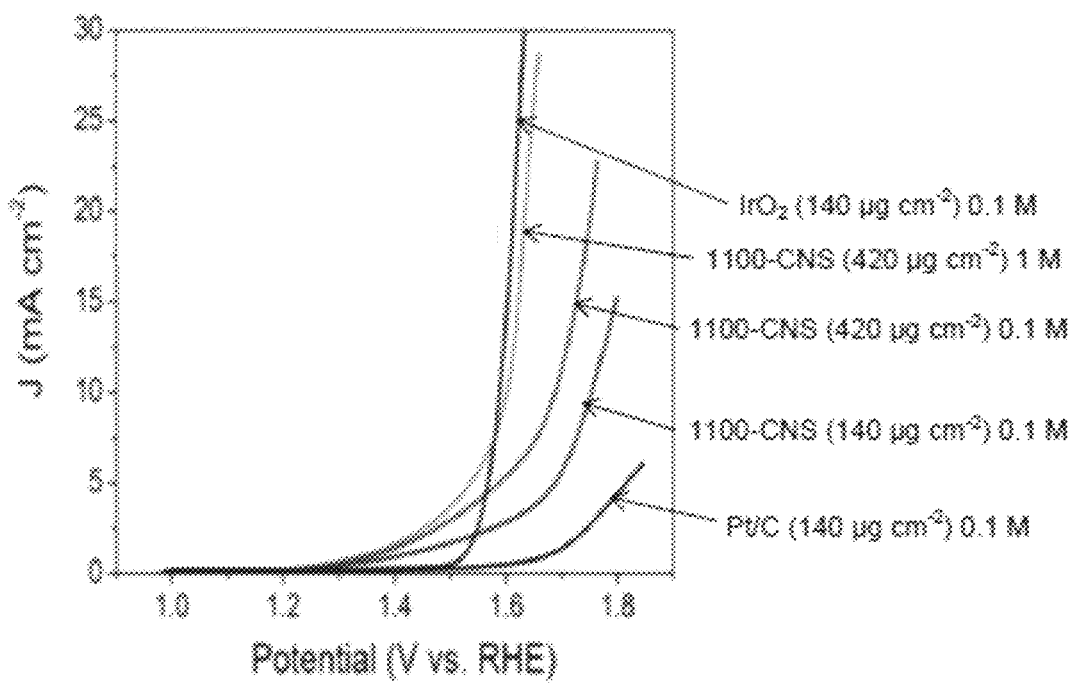
Figure 3E:
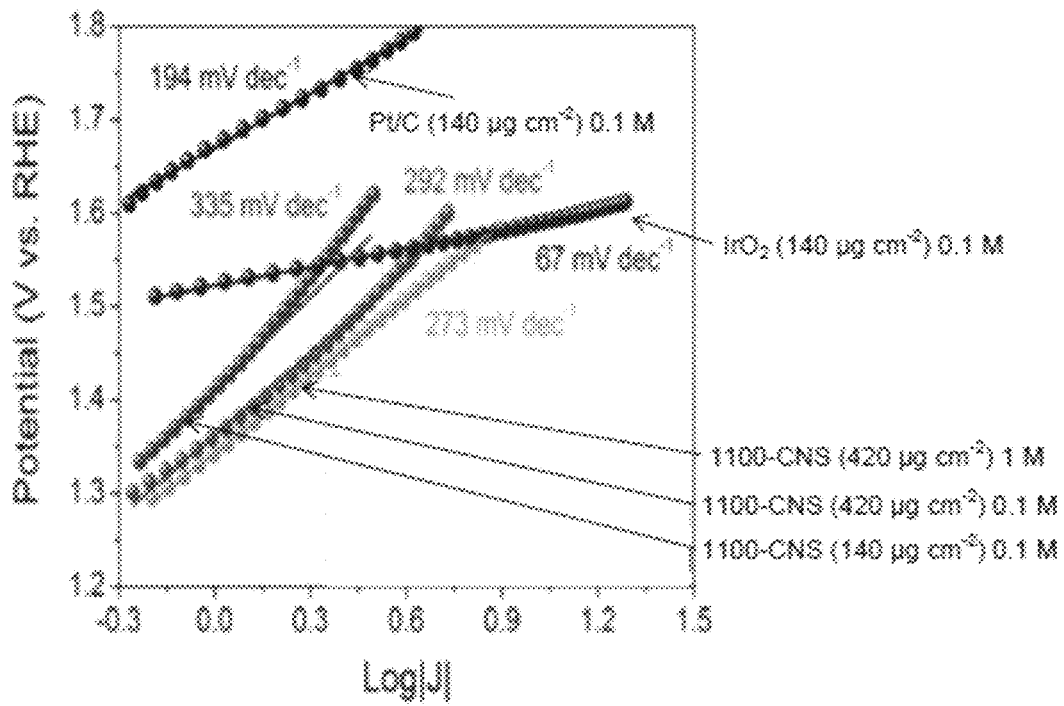
Figure 19:
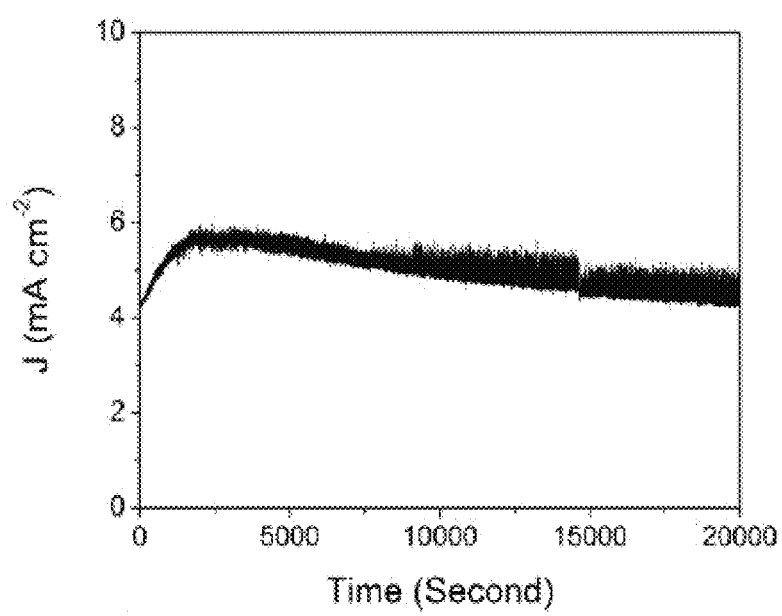
FIG. 19 refers to a chronoamperometric durability test of 1100-CNS at 1.60 V (vs. RHE) in 0.1 M KOH, iR not corrected.

Interestingly, the doped porous carbon catalyst also exhibits good OER activity in alkaline solution. Polarization curves indicate that the 1100-CNS sample (at 420 μg cm$^{-2}$) can exert the OER with a small overpotential of 70 mV and afford an oxidation current density of 10 mA cm$^{-2}$ at 1.69 V in 0.1 M KOH, all dramatically outperform those from the Pt/C catalyst (FIG. 3D). Compared with the benchmark IrO$_2$ OER catalyst, the metal-free sample still displays smaller onset potential though with lower current density at larger overpotentials (FIG. 3D). The corresponding Tafel slope of the 1100-CNS sample is calculated to be 292 mV dec$^{-1}$ (FIG. 3E), comparable with other ORR/OER bifunctional metal-free catalysts (Zhang, J. et al., Nature Nanotechnology 10, 444-452, 2015, Liu, Q. et al., Adv. Mater. 28, 3000-3006, 2016). More concentrated alkaline electrolyte could facilitate the OER of the sample as revealed by both the LSV curves and Tafel slopes (FIG. 3D, 3E), and the catalyst was also found to show good stability in a continuous amperometric i-t test (FIG. 19). Recent studies suggest that the high electronegativity of the N and O atoms with the carbon matrix can render the adjacent carbon atoms positive charged, which could then facilitate the adsorption of the reaction intermediates (OH$^-$, OOH$^-$) and subsequent oxidation reactions (Yang, H. B. et al., Sci. Adv. 2, e1501122, 2016, Chen, S. et al., Adv. Mater. 26, 2925-2930, 2014, Liu, Q. et al., Adv. Mater. 28, 3000-3006, 2016). It is thus deduced that the OER activity of the present sample also originates from the N and O containing species (e.g., electron-withdrawing pyridinic N and ketonic C=O groups) in the carbon skeleton.

Summing up, the activity of the ORR/OER bifunctional 1100-CNS sample ranks in top level among the reported catalysts (Table 4).

TABLE 4

Comparison study of some recently reported bi-functional ORR/OER catalysts in alkaline electrolyte

| Catalyst | Loading Mass (mg cm$^{-2}$) | OER Onset Potential (V vs. RHE) | OER E$_{j=10}$ (V vs. RHE) | ORR E$_{1/2}$ (V vs. RHE) | ΔE (E$_{j=10}$ − E$_{1/2}$) (V) | Electrolyte | Reference |
|---|---|---|---|---|---|---|---|
| MnO$_x$ Film | — | 1.30 | 1.77 | 0.73 | 1.04 | 0.1M KOH | J. Am. Chem. Soc. 2010, 132, 13612 |
| Co$_3$O$_4$/N-doped | 1.0 | 1.40 | 1.54 | 0.83 | 0.71 | 1M KOH | Nat. Mater. 2011, 10, 780 |

TABLE 4-continued

Comparison study of some recently reported bi-functional ORR/OER catalysts in alkaline electrolyte

| Catalyst | Loading Mass (mg cm$^{-2}$) | OER Onset Potential (V vs. RHE) | OER $E_{j-10}$ (V vs. RHE) | ORR $E_{1/2}$ (V vs. RHE) | $\Delta E$ ($E_{j-10} - E_{1/2}$) (V) | Electrolyte | Reference |
|---|---|---|---|---|---|---|---|
| grapheme H—Pt/CaMnO$_3$ | 0.085 | 1.50 | 1.80 | 0.79 | 1.01 | 0.1M KOH | Adv. Mater. 2014, 26, 2047 |
| Mn$_x$O$_y$/N-doped carbon | 0.21 | 1.55 | 1.68 | 0.81 | 0.87 | 0.1M KOH | Angew. Chem. Int. Ed. 2014, 53, 8508 |
| CoO/N-doped grapheme | 0.7 | 1.30 | 1.57 | 0.81 | 0.76 | 1M KOH | Energy Environ. Sci. 2014, 7, 609 |
| Fe@N—C | 0.31 | ca. 1.52 | 1.71 | 0.83 | 0.88 | 0.1M KOH | Nano Energy 2015, 13, 387 |
| P-doped C3N4 on carbon-fiber paper | 0.2 | 1.53 | 1.63 | 0.67 | 0.96 | 0.1M KOH | Angew. Chem. Int. Ed. 2015, 54, 4646 |
| N-doped porous carbon fiber | 0.1 | 1.43 | 1.84 | 0.82 | 1.02 | 0.1M KOH | Adv. Mater. 2016, 28, 3000 |
| N, S-doped carbon nanosheet | 0.2 | | 1.65 | 0.77 | 0.88 | 0.1M KOH | Nano Energy 2016, 19, 373 |
| N-doped grapheme | 0.3 | 1.53 (1.51) | 1.66 (1.59) | 0.84 (0.84) | 0.82 (0.75) | 0.1M KOH (1M KOH) | Sci. Adv. 2016, 2: e1501122 |
| N, S-doped porous carbon | 0.42 | 1.30 (1.30) | 1.69 (1.60) | 0.88 (0.88) | 0.81 (0.72) | 0.1M KOH (1M KOH) | This invention |

Figure 3F:
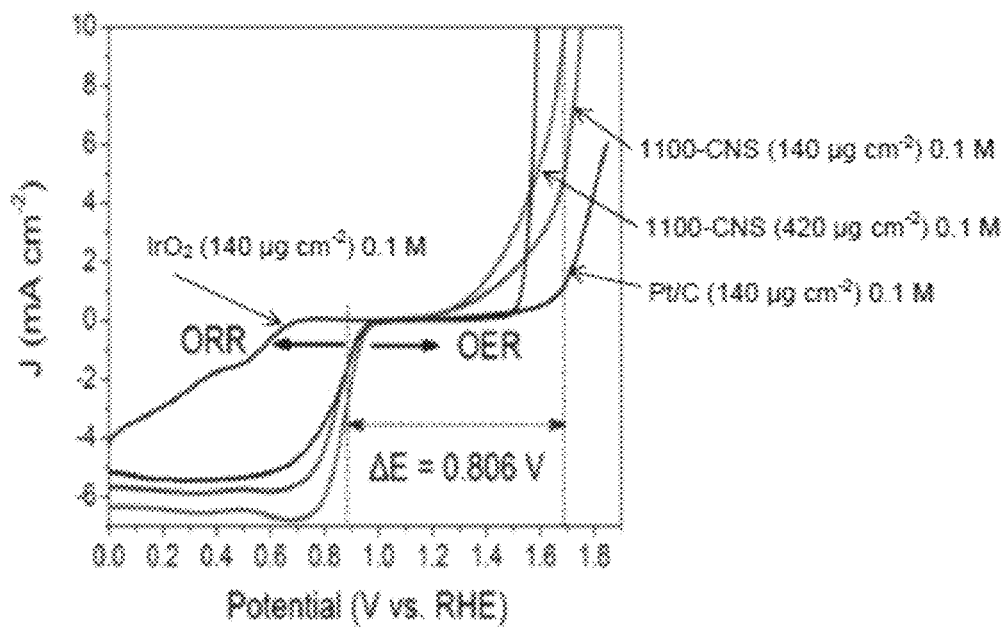

The $\Delta E$ value, which is defined as difference between the OER potential being taken at 10 mA cm$^{-2}$ (E) and the $E_{1/2}$ in ORR (namely, $\Delta E = E_{j=10} - E_{1/2}$) of the 1100-CNS sample is ca. 0.81 V in 0.1 M KOH and 0.72 V in 1 M KOH (FIG. 3D, 3F), both are superior than many metal-free and transitional-metal based bi-functional catalysts (Table 4).

Example 1D

Rechargeable Zn-Air Battery in a Two Electrode Configuration Comprising the Hierarchically Porous Carbon Material Prepared According to Example 1A The air electrodes for the Zn-air battery use stainless steel mesh (SSM) as backing layer, with a gas diffusion layer (GDL) on the air-facing side and catalyst on the water-facing side. A carbon ink consists of carbon black and polytetrafluoroethylene (PTFE) emulsion (60 wt.-%) according to a mass of 3:7 was painted onto the backing layer to form the GDL, which then subject to heating at 200° C. for 30 min. The catalyst was then loaded onto the other side of the SSM by drop-casting with a loading mass of 2.0 mg cm$^{-2}$ for metal-free catalyst and 1.0 mg cm$^{-2}$ for Pt/C catalyst. The catalyst ink was prepared as described herein. A polished Zn plate served as anode and the electrolyte were 6.0 M KOH for Zn-air primary batteries and 6.0 M KOH with 0.2 M Zn(Ac)$_2$ for rechargeable Zn-air batteries. The GDL has an effective area of 1 cm$^2$ and allows O$_2$ from ambient air to reach the catalyst sites.

Figure 4A:
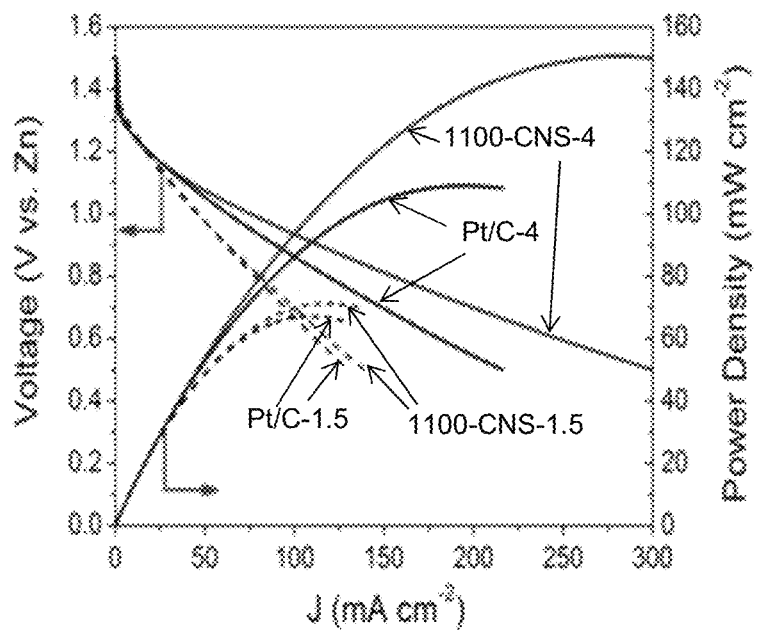
FIGS. 4A through 4F refer to Zn-air battery performances of the hierarchically porous N, S dually-doped carbon material prepared according to the present invention.
Figure 20:
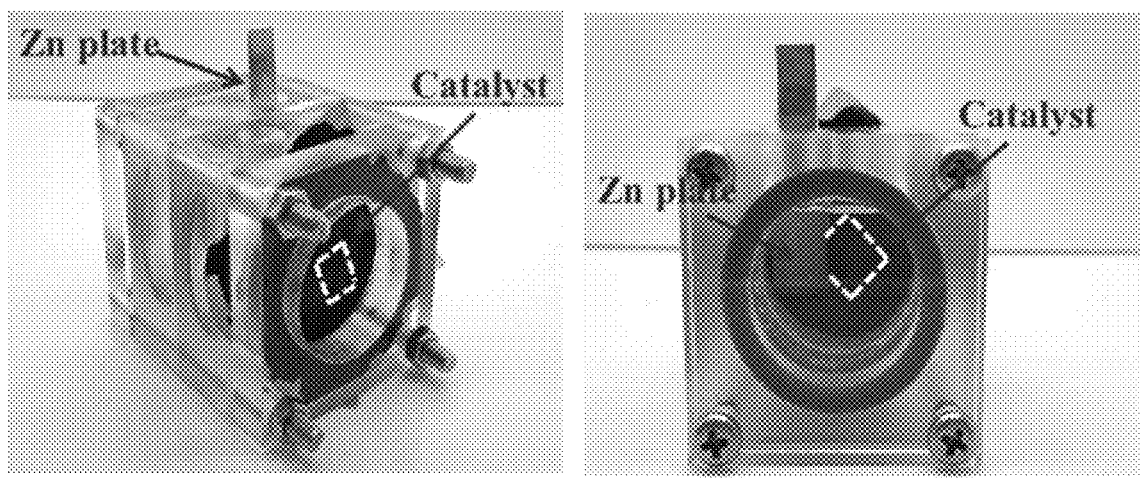
FIG. 20 shows a side-view and a front-view of the static Zn-air battery device. The presented Zn plate is 1×1.5 cm in size while all casted catalysts are 1×1 cm in size.

In the light of the prominent ORR and the OER activity of the synthesized sample, the practical energy conversion application has been evaluated by assembling it into a rechargeable Zn-air battery device. The catalyst was loaded onto a gas diffusion carbon layer coated stainless steel as an air cathode and a Zn plate was used directly as anode (FIG. 20). The device was tested in static ambient atmosphere, that is, no air purging, to simulate the real working condition of the battery. The thus assembled Zn-air battery delivers an open circuit voltage (OCV) of ca. 1.49 V (FIG. 4A), approaching the theoretical value (1.65 V) of the Zn-air system (Li, Y. and Dai, H., Chem. Soc. Rev. 43, 5257-5275, 2014). Interestingly, the polarization curve and the output power density of the two-electrode system were found to be dependent on the area of the Zn anode. Increasing the area of the Zn plate from 1.5 cm$^2$ to 4 cm$^2$ resulted in a remarkably enhancement of the current density, and the corresponding peak power densities from the metal-free catalyst were determined to be 72 and 151 mW cm$^{-2}$, respectively. This phenomenon is presumably caused by the reduced polarization on the Zn anode (also as counter electrode) which has a larger area (Li, Y. and Dai, H., Chem. Soc. Rev. 43, 5257-5275, 2014).

Figure 4B:
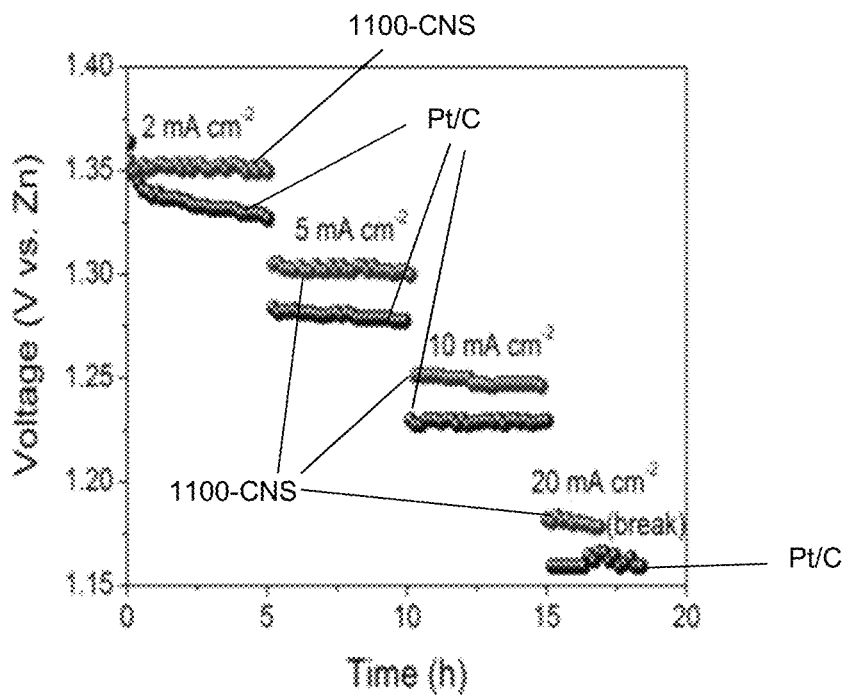
Figure 4C:
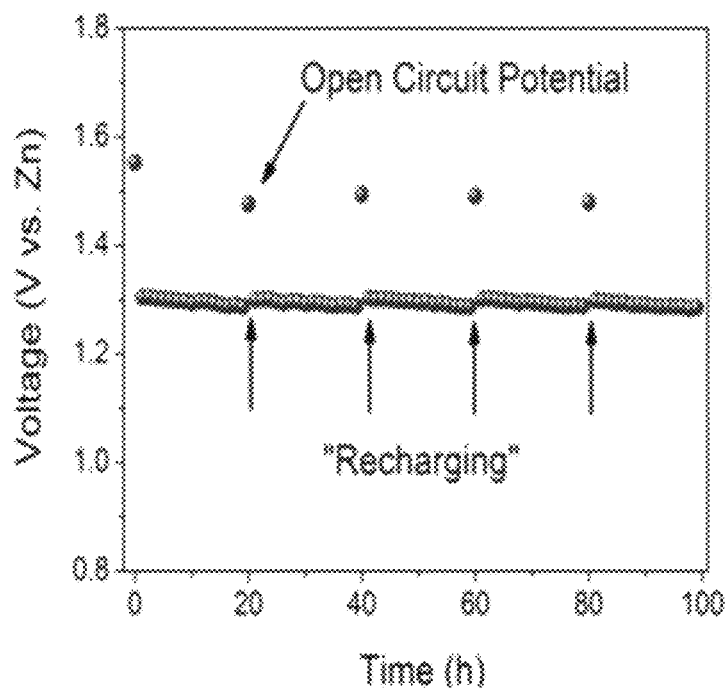

Noticeably, the 1100-CNS sample affords larger current density and power density compared with the Pt/C (113 mW cm$^{-2}$ vs. 4 cm$^2$ Zn) catalyst in both cases (FIG. 4A), and the voltage plateaus of the 1100-CNS at different current densities in the galvanostatic discharge process are also higher than those from the Pt/C counterpart (FIG. 4B). These superior performance values from the metal-free catalyst are bestowed, at least partially, by the facilitated mass transport from the macroporous structure especially at large discharge currents where O$_2$ consumption is vast. Furthermore, no obvious potential drop was observed in the galvanostatic discharging at different current densities until the exhaust or the break of the Zn plate (FIG. 4B), in accordance with the good stability in the ORR test. The battery can also be regenerated by refueling the Zn and the KOH solution periodically, and the potential is almost constant in a 100 h continuous discharging process at 5 mA cm$^{-2}$ (FIG. 4C), attesting again the robustness of the metal-free catalyst.

Figure 4D:
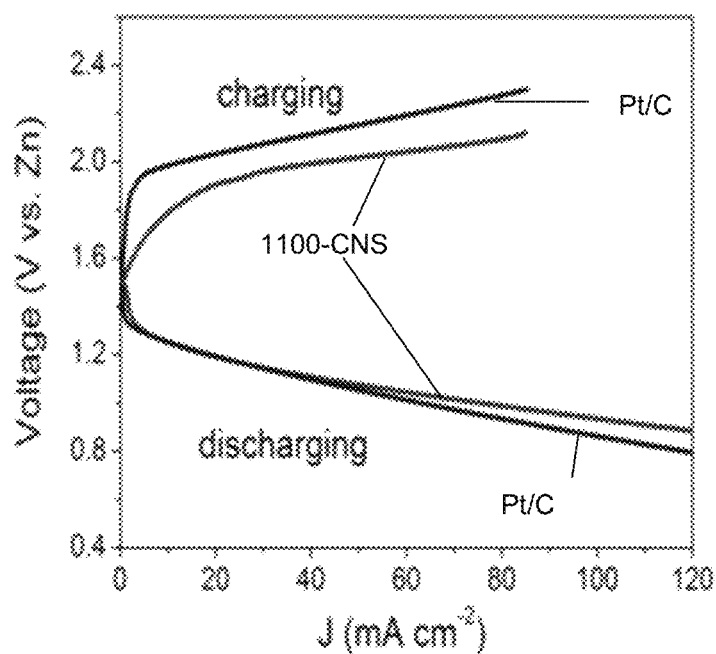
Figure 4E:
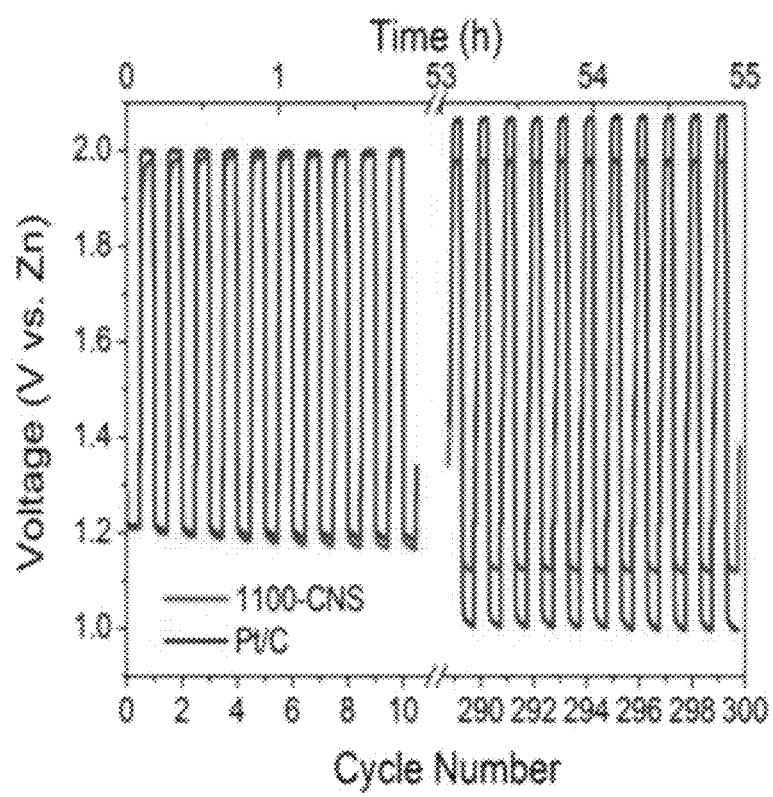
Figure 4F:
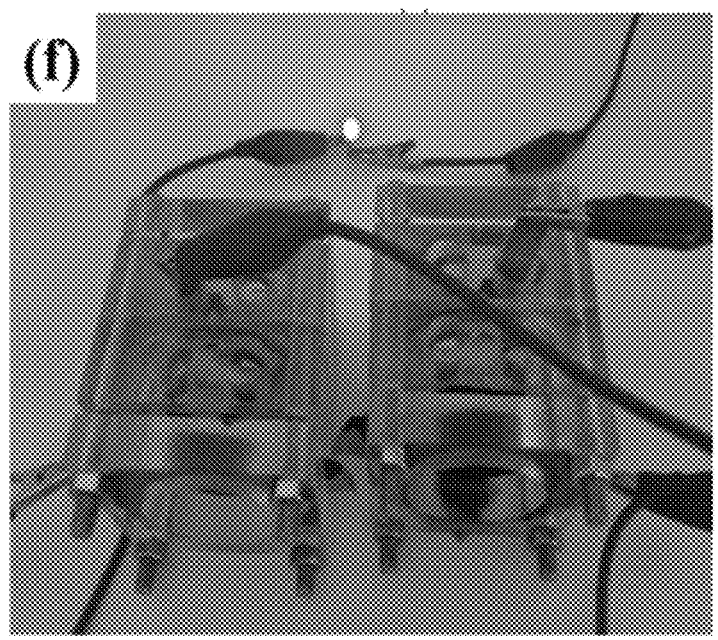

The rechargeable performances of the catalyst was then assessed by adjusting a 6 M KOH with 0.2 M Zn(Ac)$_2$ electrolyte. FIG. 4D shows that the 1100-CNS sample could execute the charge-discharge process with an obvious smaller voltage gap compared with that of the Pt/C sample, indicating a more efficient rechargeability. When cycled at a constant current density of 10 mA cm$^{-2}$, the metal-free catalyzer produces a small initial charge/discharge voltage gap of 0.77 V with a round-trip efficiency of 61% (FIG. 4E). After 300 cycles over a period of 55 h (11 min for one cycle), the 1100-CNS sample demonstrated a slight performance loss with the voltage gap increased by only 85 mV, whilst the Pt/C sample exhibits a considerable increase of 265 mV under the same condition (FIG. 4E). The good stability of the porous 1100-CNS sample can thus enable a long-term work loading, which is also exemplified by a continuous lighting of a light-emitting diode by two integrated Zn-air batteries in series for over 12 h without brightness fading (FIG. 4F).

The invention claimed is:

1. A method for preparing a hierarchically porous doped carbon material comprising a step of heating a mixture comprising an etching agent precursor and a pore-generating agent which is embedded in a matrix comprising a carbon source and a dopant source for simultaneously carbonizing the carbon source, doping with the dopant and etching the pore-generating agent for obtaining the hierarchically porous doped carbon material, wherein the carbon source is a carbohydrate.

2. The method of claim 1, wherein etching the pore-generating agent includes decomposing the etching agent precursor and forming the etching agent for etching during the heating step and wherein doping with the dopant includes decomposing the dopant source during the heating step for providing the dopants for the doping.

3. The method of claim 2, wherein the etching agent formed is hydrogen fluoride.

4. The method of claim 1, wherein the heating step includes a pre-heating to a temperature of between about 550° C. and about 650° C. and holding that temperature for about 30 min to about 90 min and a subsequent main heating to a temperature of between about 750° C. and about 1150° C. and holding that temperature for about 2.5 h to about 3.5 h.

5. The method of claim 1, wherein the heating includes a pre-heating to about 600° C. and holding that temperature for about 60 min and a subsequent main heating to a temperature of about 1100° C. and holding that temperature for about 3 h.

6. The method of claim 1 further comprising a step of embedding the pore-generating agent in the matrix comprising providing a pre-mixture containing a pore-generating agent, a carbon source and a dopant source and subjecting said mixture to conditions under which the matrix is formed.

7. The method of claim 6, wherein the conditions under which the matrix is formed include heating the pre-mixture for polymerization of the carbon source and optional cross-linking by the dopant source.

8. The method of claim 7, wherein the conditions under which the matrix is formed include heating the pre-mixture up to a temperature of between about 120° C. and about 200° C. and holding that temperature for at least about 5 h.

9. The method of claim 7, wherein the pre-mixture further comprises a solvent and a catalyst able to catalyze the matrix formation and wherein subjecting said pre-mixture to conditions under which the matrix is formed further include subjecting the pre-mixture to sonication and removing the solvent portion of the pre-mixture before heating for polymerization of the carbon source and cross-linking by the dopant source.

10. The method of claim 9, wherein the solvent is water and the catalyst is sulfuric acid and wherein sonication is carried out for at least about 5 min and the solvent portion is removed by heating the pre-mixture up to about 100° C.

11. The method of claim 1, wherein the pore-generating agent is SiO$_2$ and the carbon source is selected from a monosaccharide, a disaccharide or mixtures thereof.

12. The method of claim 1, wherein the etching agent precursor is polytetrafluoroethylene.

13. The method of claim 12, wherein the carbon source is sucrose, the pore-generating agent is SiO$_2$ and wherein the weight ratio of the pore-generating agent to the etching agent precursor is about 1:5 to 1:20.

14. The method of claim 1, wherein the hierarchically porous carbon material is doped with one or more heteroatom.

15. The method of claim 1, wherein the hierarchically porous carbon material is doped with nitrogen and sulfur.

16. The method of claim 15, wherein the hierarchically porous doped carbon material comprises a total amount of nitrogen and sulfur of between about 2 wt.-% and about 10 wt.-% and of carbon of about 85 wt.-% and about 98 wt.-%.

17. The method of claim 15, wherein the relative content of nitrogen in form of graphitic nitrogen is at least about 80% of the total amount of the nitrogen in the hierarchically porous doped carbon material.

18. The method of claim 1, wherein the dopant source is trithiocyanuric acid.

19. The hierarchically porous doped carbon material obtained by the method of claim 1.

20. The hierarchically porous doped carbon material of claim 19 which has a specific surface area of at least about 700 m$^2$/g and a total pore volume of at least about 1.7 cm$^3$/g and at most about 2.0 cm$^3$/g formed by macropores, mesopores and micropores.

21. The hierarchically porous doped carbon material of claim 19 which exhibits a pore size distribution with at least one peak between about 80 nm and about 100 nm and between about 5 nm and about 15 nm.

22. The hierarchically porous doped carbon material of claim 19, which exhibits an ORR half-wave potential versus reversible hydrogen electrode of at least about 0.8 at a loading of about 0.14 mg/cm$^2$ and about 0.42 mg/cm$^2$ in 0.1 M KOH, an ORR half-wave potential versus reversible hydrogen electrode in 0.1 M HClO$_4$ and in 0.5 M H$_2$SO$_4$ of at least about 0.7 and an ΔE value as difference between the OER potential being taken at 10 mA/cm$^2$ and the ORR half-wave potential of at most about 0.9 in 0.1 M KOH and in 1 M KOH.

23. An electrode comprising the hierarchically porous doped carbon material of claim 19.

24. An energy storage and conversion device comprising the hierarchically porous doped carbon material of claim 19.

* * * * *